(12) United States Patent
Roberts et al.

(10) Patent No.: US 11,385,153 B2
(45) Date of Patent: Jul. 12, 2022

(54) GREY WATER MEASUREMENT

(71) Applicant: GCP Applied Technologies Inc., Cambridge, MA (US)

(72) Inventors: Mark Roberts, North Andover, MA (US); Nathan Tregger, Northborough, MA (US); Stephen Klaus, Waban, MA (US)

(73) Assignee: GCP Applied Technologies Inc., Cambridge, MA (US)

( * ) Notice: Subject to any disclaimer, the term of this patent is extended or adjusted under 35 U.S.C. 154(b) by 305 days.

(21) Appl. No.: 16/316,752

(22) PCT Filed: Aug. 9, 2018

(86) PCT No.: PCT/US2018/045996
§ 371 (c)(1),
(2) Date: Jan. 10, 2019

(87) PCT Pub. No.: WO2019/032820
PCT Pub. Date: Feb. 14, 2019

(65) Prior Publication Data
US 2021/0333187 A1   Oct. 28, 2021

Related U.S. Application Data

(60) Provisional application No. 62/544,028, filed on Aug. 11, 2017.

(51) Int. Cl.
*G01N 11/14* (2006.01)
*B28C 5/42* (2006.01)
(Continued)

(52) U.S. Cl.
CPC .............. *G01N 11/14* (2013.01); *B28C 5/422* (2013.01); *B28C 5/4231* (2013.01); *B28C 7/024* (2013.01);
(Continued)

(58) Field of Classification Search
CPC .......... G01F 23/24; G01F 23/26; G01F 23/28; G01N 33/383; G01N 2011/0046; G01N 11/10
See application file for complete search history.

(56) References Cited

U.S. PATENT DOCUMENTS 2,324,304 A    7/1943  Katzman
2,999,381 A    9/1961  Chope et al.
(Continued)

FOREIGN PATENT DOCUMENTS

CN    104944851 A    9/2015
DE    102012017445 A1 *  3/2014  ........... B28C 5/2045
(Continued)

OTHER PUBLICATIONS

Espacenet Machine Translation of DE 102012017445 A1 Which Originally Published on Mar. 27, 2014. (Year: 2014).*
(Continued)

*Primary Examiner* — David A. Rogers
(74) *Attorney, Agent, or Firm* — Craig K. Leon

(57) ABSTRACT

Method and system to measure and monitor the grey water content in a rotating concrete mixer drum mixer truck using a sensor attached to the interior of the concrete mixer drum. By measuring the grey water content before a batching process takes place, the batched water (and cement content and admixture type and content) can be modified in order to maintain expected performance of the batched load in terms of both strength and rheology, or more simply, some or all of the grey water can be discharged from the concrete mixer drum before batching.

30 Claims, 11 Drawing Sheets

(51) Int. Cl.
  *B28C 7/02* (2006.01)
  *B28C 7/04* (2006.01)
  *G01N 11/00* (2006.01)

(52) U.S. Cl.
  CPC ............ *B28C 7/026* (2013.01); *B28C 7/0404* (2013.01); *G01N 2011/0053* (2013.01)

(56) References Cited

U.S. PATENT DOCUMENTS

| | | | |
|---|---|---|---|
| 3,631,712 A * | 1/1972 | Mercier | G01N 33/383 73/54.03 |
| 3,640,121 A * | 2/1972 | Mercier | G01N 33/26 73/54.03 |
| 4,104,584 A | 8/1978 | Miyai et al. | |
| 4,263,511 A | 4/1981 | Hirschberg | |
| 4,356,723 A * | 11/1982 | Fay | G01N 11/00 73/54.03 |
| 4,438,480 A | 3/1984 | Chambaz et al. | |
| 4,780,665 A | 10/1988 | Mitchell | |
| 4,900,154 A * | 2/1990 | Waitzinger | G01N 33/383 366/40 |
| 5,099,688 A | 3/1992 | De Mars | |
| 5,695,280 A * | 12/1997 | Baker | B28C 7/0007 366/27 |
| 5,752,768 A * | 5/1998 | Assh | B28C 5/422 366/60 |
| 5,948,970 A * | 9/1999 | Te'eni | B28B 23/0031 73/54.23 |
| 6,227,039 B1 * | 5/2001 | Te'eni | B28C 7/024 73/53.04 |
| 7,033,321 B1 | 4/2006 | Sarvazyan | |
| D638,729 S * | 5/2011 | Beaupre | D10/78 |
| 8,020,431 B2 | 9/2011 | Cooley et al. | |
| 8,118,473 B2 | 2/2012 | Compton et al. | |
| 8,311,678 B2 | 11/2012 | Koehler et al. | |
| 8,491,717 B2 | 7/2013 | Koehler et al. | |
| 8,727,604 B2 | 5/2014 | Cooley et al. | |
| 8,727,608 B2 | 5/2014 | Blakeley | |
| 8,746,954 B2 | 6/2014 | Cooley et al. | |
| 8,764,272 B2 | 7/2014 | Hazrati et al. | |
| 8,764,273 B2 | 7/2014 | Koehler et al. | |
| 8,818,561 B2 | 8/2014 | Koehler et al. | |
| 8,858,061 B2 | 10/2014 | Berman | |
| 8,922,379 B1 | 12/2014 | Meyer | |
| 8,989,905 B2 | 3/2015 | Sostaric et al. | |
| 9,199,391 B2 | 12/2015 | Beaupre et al. | |
| 9,466,203 B2 | 10/2016 | Jordan et al. | |
| 9,550,312 B2 | 1/2017 | Roberts et al. | |
| 9,625,891 B2 | 4/2017 | Berman | |
| 9,702,863 B2 * | 7/2017 | Beaupré | G01N 33/383 |
| 9,789,628 B2 * | 10/2017 | Chun | B28C 7/12 |
| 10,041,928 B2 * | 8/2018 | Berman | B28C 7/024 |
| 10,052,794 B2 * | 8/2018 | Beaupré | B28C 7/12 |
| 10,126,288 B2 * | 11/2018 | Radjy | G01N 33/383 |
| 10,183,418 B2 * | 1/2019 | Jordan | G01N 33/383 |
| 10,520,410 B2 * | 12/2019 | Beaupre | G01N 11/14 |
| 10,647,026 B2 * | 5/2020 | Jordan | B28C 5/422 |
| 10,940,610 B2 * | 3/2021 | Clifton | B28C 5/4217 |
| 10,989,643 B2 * | 4/2021 | Beaupre | G01N 33/383 |
| 11,041,794 B2 * | 6/2021 | Beaupre | G01N 11/00 |
| 11,224,989 B2 * | 1/2022 | Beaupre | B28C 5/4217 |
| 11,230,217 B2 * | 1/2022 | Beaupre | B28C 5/422 |
| 2009/0171595 A1 | 7/2009 | Benegas | |
| 2011/0077778 A1 | 3/2011 | Berman | |
| 2012/0204625 A1 * | 8/2012 | Beaupre | B28C 7/024 73/54.31 |
| 2015/0051737 A1 | 2/2015 | Berman | |
| 2015/0298351 A1 * | 10/2015 | Beaupré | B01F 33/5021 366/7 |
| 2015/0355160 A1 | 12/2015 | Berman | |
| 2016/0025700 A1 * | 1/2016 | Beaupré | B28C 5/422 73/32 R |
| 2017/0028586 A1 | 2/2017 | Jordan et al. | |
| 2017/0072916 A1 | 3/2017 | Beck et al. | |
| 2017/0108421 A1 * | 4/2017 | Beaupre | G01N 11/10 |
| 2017/0173822 A1 * | 6/2017 | Beaupre | G01F 15/022 |
| 2018/0100791 A9 * | 4/2018 | Beaupre | G01N 11/14 |
| 2019/0204197 A1 * | 7/2019 | Beaupre | G01N 29/4427 |
| 2020/0230842 A1 * | 7/2020 | Datema | B28C 5/422 |
| 2020/0232966 A1 * | 7/2020 | Beaupre | G01N 33/383 |
| 2020/0282597 A1 * | 9/2020 | Beaupre | C04B 40/0028 |
| 2021/0001765 A1 * | 1/2021 | Beaupre | B28C 7/026 |
| 2021/0031408 A1 * | 2/2021 | Beaupre | B28C 5/4248 |
| 2021/0055195 A1 * | 2/2021 | Beaupre | B28C 7/024 |

FOREIGN PATENT DOCUMENTS

| | | | | |
|---|---|---|---|---|
| DE | 102017102351 | A1 * | 8/2018 | |
| JP | 2008100407 | A * | 5/2008 | |
| WO | 2007/060272 | A2 | 5/2007 | |
| WO | 2015/073825 | A1 | 5/2015 | |
| WO | 2015/160610 | A1 | 10/2015 | |
| WO | WO-2020231728 | A1 * | 11/2020 | ........... B28C 5/0806 |
| WO | WO-2021252277 | A1 * | 12/2021 | |

OTHER PUBLICATIONS

Espacenet Machine Translation of JP 2008100407 A Which Originally Published on May 1, 2008. (Year: 2008).*
International Search Report and Written Opinion dated Dec. 11, 2018 in corresponding PCT application No. PCT/US18/45996.

* cited by examiner

GREY WATER MEASUREMENT

FIELD

Embodiments disclosed herein relate to grey water measurement in a rotating mixer drum and more particularly, a method and system to automatically account for grey water remaining in a concrete mixer drum mixer truck and adjusting batching processes to provide a proper water content for subsequently batched loads of concrete.

BACKGROUND

Water content, and more specifically, the water-to-cementitious ratio (w/cm) is a critical factor to the strength development of concrete and other cementitious materials (see e.g., "Generalization of the Abrahms' Law—Prediction of strength development of concrete from cement properties," Popovics, S., in *ACI Materials Journal*, v. 78, pp. 123-129, 1981). In general, the strength decreases according to the cubed root of the w/cm. Sources of water include water intentionally batched during the batching process along with the coarse aggregates, fine aggregates, cement and other cementitious material (e.g. fly ash, slag) and chemical admixtures. Water is also accounted for in the pores and on the surface of the aggregates and can be a significant contribution to the total water content. Furthermore, water can be added by the concrete mixer truck driver at the "slump rack," which is the area in a concrete production plant where the mixer truck is washed and the slump may be adjusted by the concrete mixer truck driver with water. Similarly, at the jobsite, the contractor may instruct the driver to add additional water. Currently, there exists automated slump monitoring and management systems that not only adjust slump with water or admixture, but record all water added during the manufacturing and delivery cycle as well (see e.g., U.S. Pat. No. 8,118,473). These systems intend to minimize the human factor on the manufacturing process and also to properly document for all water sources. However, another source of water that is not yet quantifiable in a practical manner is from mixer truck drivers who will leave grey water, or water remaining after rinsing out the previous load of concrete from the concrete mixer drum (the water being grey as it still contains cement paste), to remain in the drum in order to circumvent automated slump monitoring and management systems. This extra water provides a higher slump (and easier placing as preferred by the contractor), but lower strength if the water content is not properly accounted for.

Water or moisture meters are measuring devices capable of determining either the presence of water or the actual water content of a given material. Concerning the first type, there are meters, for example, which can send alarms to home owners if a water leak is detected around an appliance such as a water heater (see for example, U.S. Pat. No. 8,922,379). For the second type, for example, there exist aggregate moisture meters that are able to measure the moisture content of an aggregate sample. Either type of water meter can employ several different types of technologies such as (but not limited to) measuring electrical resistance (see e.g., U.S. Pat. No. 4,780,665), measuring microwaves (see e.g., U.S. Pat. No. 4,104,584), measuring nuclear resonance (see e.g., U.S. Pat. No. 2,999,381) and measuring infrared waves (see e.g., U.S. Pat. No. 8,727,608).

In U.S. Pat. Nos. 8,858,061 and 9,625,891 of Berman (Sensocrete Inc./GCP Applied Technologies), it is taught that a sensor which extends into the interior of a concrete mixer drum can be equipped with a moisture meter (see Col. 3, Line 35). This meter is used to determine the moisture content of the concrete contained within the drum, but makes no mention of determining water remaining in the drum before batching. As a moisture content meter, is measures the water content of the concrete based on a calibration curve. This can then be related to the water-to-cement ratio. If used without modification, the moisture meter would not determine the quantity of water left in the drum, but it would simply measure the moisture of the water, which would read near 100%. Both U.S. Pat. Nos. 8,858,061 and 9,625,891 also remain silent on the influence of truck angle and data collection rate; both which are required to achieve an accurate and meaningful grey water measurement.

It is therefore an object of embodiments disclosed herein to provide a method and system to measure the amount of grey water in a mixer drum and adjust subsequent batching processes to provide a proper water content for the batched concrete load.

It is another object to provide a method to measure whether grey water is present in a mixer drum and if so, alert an operator so that the grey water can be removed before the next batch is loaded into the drum.

SUMMARY

In surmounting the disadvantages of prior art approaches, embodiments disclosed herein provide a novel method to measure and/or monitor the grey water content in a concrete mixer truck. By measuring the grey water content remaining in a mixer drum left over from one or more previous batches, before the next batching process takes place, the batched water for that next batching process (and/or cement content and/or admixture type and content) can be modified in order to maintain expected performance of the batched load in terms of both strength and rheology, or more simply, grey water determined to be present in the mixer drum can be discharged from the concrete mixer drum before the next batching process takes place. Stated differently, the content of one or more of the various components of the next batch of concrete can be modified based on the determined amount of grey water present in the mixing drum, such as by adding less water, or by adding more cement.

Currently, the water content for a given concrete load can be recorded for the contactor and includes water added during the batching process (including water contained within the aggregates) and occasionally water added during delivery or at the discharge site. Typically, water added at the slump rack is not documented. Although U.S. Pat. No. 9,466,203 demonstrates a process to determine when undocumented water is added, water left in the drum after discharging of the concrete load currently remains unaccounted for.

It is taught in U.S. Pat. Nos. 8,858,061 and 9,625,891 of Berman (Sensocrete Inc./GCP Applied Technologies), that a probe attached to the interior of a concrete mixer drum can include a moisture meter (see Col. 3, Line 35), furthermore, utilizing electrical resistivity as a means to measure moisture content of the concrete. Thus, it is taught that the moisture meters are used when the concrete mixer drum contains concrete; there is no mention of the situation when there is water remaining in a drum before a batching process.

It is also taught in U.S. Pat. No. 8,858,061 of Berman (Sensocrete Inc./GCP Applied Technologies), that a probe attached to the interior of a concrete mixer drum can estimate the volume of concrete by measuring time the probe is submerged in the concrete based on the changes in force on the probe as the probe becomes submerged or unsubmerged within the concrete. U.S. Pat. No. 9,199,391 of Beaupre also teaches a method to use a force probe to determine the concrete volume (see Col. 5, Line 53) based on the drum positions during entry of the probe into the concrete and exit of the probe out of the concrete. However, it is unlikely the same device would be sensitive enough to determine presence of water (especially in small quantities, e.g. 5 gallons), as the viscosity of water is orders of magnitude less than concrete and would not impart a substantial change in force on either force probe. For example, the viscosity of concrete typically ranges between 10 and 100 Pa·s, whereas viscosity of water is around 0.001 Pa·s, which is 4-5 orders of magnitude less.

In accordance with certain embodiments, a method and system to automatically detect and measure the amount of grey water in a concrete mixer truck using one or more sensors such as a water meter located inside the concrete mixer drum are provided. In some embodiments, one or more sensors attached to the interior of the concrete mixer drum is used. The sensor or sensors such as a water meter can employ one or more different technologies such as (but not limited to) measuring the electrical resistance (see e.g., U.S. Pat. No. 4,780,665), measuring capacitance (see e.g. U.S. Pat. No. 4,438,480), measuring microwaves (see e.g., U.S. Pat. No. 4,104,584), measuring the nuclear resonance (see e.g., U.S. Pat. No. 2,999,381), measuring infrared waves (see e.g., U.S. Pat. No. 8,727,608), measuring acoustic waves (see e.g., U.S. Pat. No. 7,033,321), measuring the light scatter (see e.g., U.S. Pat. No. 4,263,511), or measuring the light scatter in particular for turbidity measurements (see e.g., U.S. Pat. No. 2,324,304). In certain embodiments, as the concrete drum rotates, the sensor or sensors, which may be fixed on the drum interior, will rotate in and out of the grey water (referred to as entry and exit events respectively). By tracking either the fraction of time or the fraction of a vessel rotation in which the sensor(s) is in contact with the grey water (referred to as the submersion fraction), or the fraction of time or the fraction of a vessel rotation in which the sensor(s) is not in contact with the grey water (referred to as the inverse fraction), or both, the volume of grey water in the vessel (e.g., drum volume) can be determined. For example, in some embodiments a calibration curve relating the submersion fraction (or inverse fraction) to the volume of grey water can be used. This calibration curve can be derived from the geometry of the drum, or created based on empirical tests. In certain embodiments, in order to achieve sufficient accuracy, both the data sampling rate and truck angle may be accounted for. Using this information, the designed water content of the next batch to be loaded into the mixer drum can be adjusted in terms of water content, cement content and/or admixture content in order to maintain the desired rheology and strength development. Alternatively, in response to the detection of the presence of grey water, the grey water can be discharged from the concrete mixer drum so that it does not influence the characteristics of the next batch to be loaded into the mixer drum, or less than all of the grey water can be discharged and the remainder can be used in the next batch loaded into the mixer drum.

In certain embodiments, a method and system is provided for determining the water content of a vessel such as a mixer drum, which allows for accurate material batching of a load of material such as concrete, or allows an operator to be alerted to the presence of water, prompting him to discharge some or all of it from the vessel prior to loading the next batch. In some embodiments, the method includes providing a concrete mixer drum having an interior and an axis of rotation; providing one or more sensors mounted in a location in the interior volume of the mixer drum, such as on an interior wall of the drum or a hatch in the drum, such that during a revolution of the mixer drum, the sensor or sensors separately achieves both a submerged state in the water in the drum interior and an unsubmerged state and generates signals indicative of each state; rotating the concrete mixer drum such that the sensor or sensors separately achieves both a submerged state in any water in said interior and an unsubmerged state; determining the angle between the axis of rotation of the concrete mixer drum and horizontal; determining the fraction of the rotation that the sensor or sensors achieves the submerged state (or the unsubmerged state) and detects the presence of water (or the absence of water) in mixer drum; providing data correlating the fractions of full revolutions of a vessel of similar or identical configuration to the mixer drum in which a sensor or sensors detected the presence of water to the volume of water in the vessel; determining the water content in the mixer drum by comparing the fraction of a full revolution that the sensor detects the presence of water determined with the data and the angle between the axis of rotation of the concrete mixer drum and horizontal; and creating an alert that the grey water content measured is greater than a pre-defined limit, adjusting the next batching process to account for the determined amount water content, or discharging the water from the drum prior to the next batching process so that the water in the mixing drum does not interfere with the next batch.

In some embodiments, a method for determining the grey water content remaining in a mixer drum from a previous concrete load that has been discharged from the mixer drum to provide accurate batching of a new concrete load into the mixer drum is provided. The method comprises:

(A) providing a concrete mixer drum having an interior volume and an axis of rotation;

(B) providing at least one sensor mounted in a location in said interior volume of said mixer drum such that during a revolution of said mixer drum, the sensor separately achieves both a submerged state in any water in said interior and an unsubmerged state and generating a signal indicative of each said state;

(C) rotating the concrete mixer drum such that the sensor separately achieves both a submerged state in any water in said interior and an unsubmerged state;

(D) determining the angle between the axis of rotation of the concrete mixer drum and horizontal;

(E) determining the submersion fraction or inverse fraction that the sensor achieves based on the rotation of Step (C);

(F) providing data correlating the submersion fraction or inverse fraction to the corresponding volume of water in a vessel that is substantially geometrically similar to said mixer drum;

(G) determining the grey water content in said mixer drum by comparing the submersion fraction determined in Step (E) with said data of Step (F) and the angle between the axis of rotation of the concrete mixer drum and horizontal determined in Step (D); and either (H) creating an alert if the grey water content detected is greater than a pre-defined limit, modifying the percentage of water in said new concrete load, based upon the grey water content determined in step (G), discharging at least a portion of the grey water from said mixer drum based upon the grey water content determined in step (G), or a combination thereof.

In certain embodiments, in the foregoing method as well as in other methods disclosed herein, the grey water has a specific gravity preferably less than 1.61, more preferably less than 1.36 and most preferably less than 1.2. This corresponds roughly with water-to-cementitious ratios of 2.5, 5 and 10 respectively. Thus, it can also be stated that the grey water has a water-to-cementitious ratio preferably greater than 2.5, more preferably greater than 5 and most preferably greater than 10. Grey water meeting any of these criteria will have a viscosity in the range of 0.001-1.00 Pa-s; and more preferably 0.001-0.100 Pa-s. In some embodiments, in the foregoing method as well as in other methods disclosed herein the senor or sensors are chosen from light scatter sensor, acoustic sensor, infrared sensor, microwave sensor, or mixtures thereof. For example, where more than one sensor is used, the sensors can be any combination of an electrical resistivity sensor, an electrical capacitance sensor, an acoustic sensor, a microwave sensor, a nuclear resonance sensor, or a light sensor. In certain embodiments, in the foregoing method as well as in other methods disclosed herein, a three-axis accelerometer on the drum is provided to take into consideration the tilt angle of the drum in the calculation of grey water in the drum.

In certain embodiments, the submersion fraction (or inverse submersion fraction) may be determined using a position determining device, such as an accelerometer, and calculating the fraction of a drum revolution that the sensor is submerged (or not submerged). In certain embodiments, the submersion fraction (or inverse fraction) may be determined using a time determining device, such as a clock, by determining the amount of time the sensor is submerged (or is not submerged) relative to the amount of time for a complete drum revolution. For example, a first time stamp can be recorded when the sensor enters the grey water, and a second time stamp can be recorded when the sensor exits the grey water. By relating the difference between these two time stamps to the time of a total drum revolution, the submersion fraction can be calculated. A clock or other timing mechanism can be used to determine these various times, such as a clock in communication with the sensor and/or a processor.

In certain embodiments, a system for determining the volume of grey water remaining in a vessel having an interior volume and an axis of rotation after a first cement load has been discharged from that vessel is disclosed, wherein the system comprises:

a motor for rotating the vessel at least one complete revolution so that the angle of the axis of rotation of the vessel with respect to horizontal can be determined;

at least one sensor in the interior volume of the vessel positioned so as to be submerged in grey water in the vessel during a first portion of one complete revolution and not submerged in the grey water in the vessel during a second portion of one complete revolution, the at least one sensor generating a first signal when it is submerged and a second signal when it is not submerged;

a positioning determining device, such as an accelerometer, for determining a submersion fraction (or inverse fraction) that is the portion of a full revolution at which the sensor is submerged (or the portion of a full revolution at which the sensor is not submerged); or a time determining device, such as a clock, for determining the submersion fraction or inverse fraction;

a processor in communication with the at least one sensor to receive the first and second signals and in communication with the positioning determining device or the time determining device and configured to calculate a ratio of the first portion or the second portion to the one complete revolution and determine a volume of grey water in the vessel based on that ratio.

The system may also include a memory in communication with the processor, wherein the memory contains a calibration curve correlating ratios of a submersion fraction to respective volumes of water in, for example, a vessel that is substantially geometrically similar to the vessel in which the grey water is being determined, wherein the processor uses the calibration curve to in its determination of the volume of grey water in the vessel based on the ratios. The memory may additionally or alternatively contain a geometric representation of the vessel, wherein the processor determines the volume of grey water using that geometric representation. In some embodiments, the vessel is a concrete mixer drum.

In certain embodiments, disclosed is a system for determining the grey water content remaining in a vessel having an interior volume and an axis of rotation after a first cement load has been discharged from the vessel, the system comprising:

a rotatable concrete mixer drum having an interior volume;

at least one sensor in the interior volume of the rotatable concrete mixer drum and positioned such that during a revolution of the rotatable concrete mixer drum, the at least one sensor separately achieves both a submerged state in water in the interior volume and an unsubmerged state and generates a signal indicate of each such state;

a position determining device, such as an accelerometer, for determining a submersion fraction (or inverse fraction) that is the portion of a full revolution at which the sensor is submerged (or the portion of a full revolution at which the sensor is not submerged); or a time determining device, such as a clock, for determining the submersion fraction or inverse fraction; and a processor having a memory containing instructions, which when executed by the processor, allow the system to: determine the submersion fraction of a revolution of the rotatable concrete mixer drum during which the sensor is in the submerged state or determine the inverse submersion fraction of a revolution of the rotatable concrete mixer drum during which the sensor is in the unsubmerged state; correlate the submersion fraction or inverse submersion fraction to a corresponding volume of water in a vessel that is substantially geometrically similar to the concrete mixer drum; and determine the volume of grey water in the concrete mixer drum based on that correlation. In some embodiments the memory may also contain instructions, which when executed by the processor, uses the angle between the axis of rotation of the rotatable concrete mixer drum and horizontal in its determination of the volume of grey water in the concrete mixer drum based on the correlation.

Further advantages and features of the embodiments disclosed herein are described in detail hereinafter.

BRIEF DESCRIPTION OF DRAWINGS

An appreciation of the benefits and features of the embodiments disclosed herein may be more readily comprehended when the following written description of preferred embodiments is considered in conjunction with the drawings, wherein.

DETAILED DESCRIPTION OF EXEMPLARY EMBODIMENTS

Figure 1:
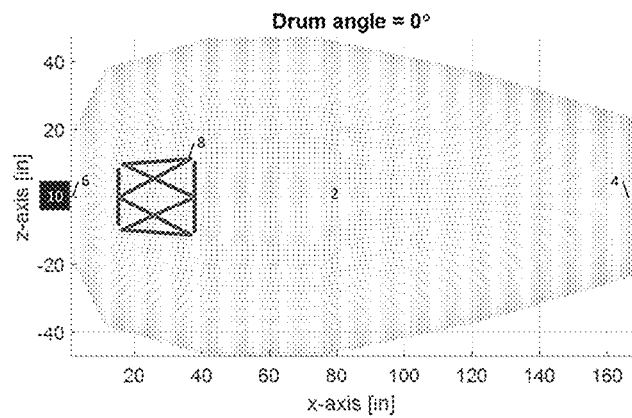
FIG. 1 is a graph showing an example concrete drum geometry including a hatch and motor.

The term "concrete" refers to cement (which often contains pozzolanic material such as limestone, fly ash, granulated blast furnace slag) and aggregates (e.g., sand, gravel) and optionally one or more chemical admixtures (e.g., plasticizers for increasing workability, set accelerator, set retarder, air entrainer, air detrainer, plastic shrinkage reducing admixtures, corrosion inhibitors (for rebar), or other admixtures for modifying a property of the concrete, whether in its plastic or hardened state).

The term "cement" as used herein includes hydratable cement such as Portland cement which is produced by pulverizing clinker consisting of hydraulic calcium silicates, aluminates and aluminoferrites, and one or more forms of calcium sulfate (e.g., gypsum) as an interground additive. Typically, Portland cement is combined with one or more supplemental cementitious materials, such as fly ash, granulated blast furnace slag, limestone, natural pozzolans, or mixtures thereof, and provided as a blend. Thus, "cement" and "cement binder" may also include supplemental cementitious materials which have been inter-ground with Portland cement during manufacture. The term "cementitious" may be used herein to refer to materials that comprise Portland cement or which otherwise function as a binder to hold together fine aggregates (e.g., sand) and coarse aggregates (e.g., crushed gravel, stone) which are used for constituting concrete.

The term "hydratable" as used herein is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO.SiO_2$ or "$C_3S$" in cement chemists' notation) and dicalcium silicate ($2CaO.SiO_2$, "$C_2S$") in which the former is the dominant form, with lesser amounts of tricalcium aluminate ($3CaO.Al_2O_3$, "$C_3A$") and tetracalcium aluminoferrite ($4CaO.Al_2O_3.Fe_2O_3$, "$C_4AF$"). See e.g., Dodson, Vance H., Concrete Admixtures (Van Nostrand Reinhold, New York, N.Y. 1990), page 1.

As used herein, the term "aggregate" as used herein shall mean and refer to sand or stone particles used for construction materials such as concrete, mortar, and asphalt, and this typically involves granular particles of average size between 0 and 50 mm. Aggregates may comprise calciferous, siliceous or siliceous limestone minerals. Such aggregates may be natural sand (e.g., derived from glacial, alluvial, or marine deposits which are typically weathered such that the particles have smooth surfaces) or may be of the "manufactured" type, which are made using mechanical crushers or grinding devices.

The terms "water meter" and "moisture meter" will refer to measuring devices capable of determining either the presence of water or additionally, the actual water content of a given material. Concerning the first type, there are meters, for example, which can send alarms to home owners if a water leak is detected around an appliance such as a water heater (see for example, U.S. Pat. No. 8,922,379). For the second type, for example, there exist aggregate moisture meters that are able to measure the moisture content of an aggregate sample. Either type of water meters can employ several different types of technologies such as (but not limited to) measuring electrical resistance (see e.g., U.S. Pat. No. 4,780,665), measuring electrical permittivity (see e.g. U.S. Pat. No. 4,438,480) measuring microwaves (see e.g., U.S. Pat. No. 4,104,584), measuring nuclear resonance (see e.g., U.S. Pat. No. 2,999,381), measuring infrared waves (see e.g., U.S. Pat. No. 8,727,608), measuring acoustic waves (see e.g., U.S. Pat. No. 7,033,321) and measuring the light scatter (see e.g., U.S. Pat. No. 4,263,511), measuring the light scatter in particular for turbidity (see e.g., U.S. Pat. No. 2,324,304). The disclosures of each of the foregoing is incorporated herein by reference. Either type can, at the very least, detect when the sensor is in direct contact with water or grey water.

Automated concrete slump management (monitoring) systems for managing slump or other rheological properties are commercially available, for example, from Verifi LLC, 62 Whittemore Avenue, Cambridge, Mass., USA, which has disclosed various automated concrete monitoring methods and systems in the patent literature, such as U.S. Pat. Nos. 8,020,431; 8,118,473; 8,311,678; 8,491,717; 8,727,604; 8,746,954; 8,764,273; 8,818,561, 8,989,905, 9,466,203, 9,550,312; PCT/US2015/025054 (Publ. No. WO 2015/160610 A1); and PCT/US2014/065709 (Publ. No. WO2015073825 A1). The disclosures of each of the foregoing is incorporated herein by reference.

Alternatively, the slump monitoring system may be based on use of a force sensor which is mounted within the drum, as taught for example in U.S. Pat. Nos. 8,858,061, 9,625,891 of Berman (Sensocrete Inc./GCP Applied Technologies), U.S. Pat. No. 9,199,391 of Denis Beaupre et al. (I.B.B. Rheologie Inc.), or US Publication No. 2009/0171595 and WO 2007/060272 of Benegas. The disclosures of each of the foregoing is incorporated herein by reference.

The term "batch process" will refer to the process of loading the mixer drum with concrete material constituents such as cement, fine and coarse aggregates, water, fibers and chemical admixtures. Typically, at ready-mix concrete plants, fine and coarse aggregates are conveyed to a weigh hopper to measure out the amount of material needed to load or batch a concrete truck. After weighing, the fine and coarse aggregate is dumped on to a conveyor belt and loaded into the mixer drum of the concrete truck. Fine powders such as cement and fly ash are typically fed into the mixer drum from a silo directly above the concrete truck. Water and chemical admixtures are delivered through liquid dispensers. The order of additions can vary greatly depending on the plant. Typically, the coarse aggregate is loaded onto the conveyor belt and the fine aggregate is loaded on top. While this is being loaded into the mixer drum, a majority of the water is added. When the majority of the aggregates is loaded, the fine powders begin to add simultaneously. After all dry materials have been batched, the remaining water along with any chemical admixtures are typically added last. During this process, a concrete mixer truck typically rotates the drum at high speed between 10 and 20 rpms to facilitate mixing of the batch constituents.

The term "grey water" will refer to material left over in a mixer drum or other similar container after delivering and discharging a load of concrete, and more frequently the material left over after rinsing out the drum after delivering and discharging a load of concrete. As such, the material mostly comprises water, cement and admixtures, although small amounts of aggregates can remain in the drum such as sand and stone. Because of the washing process, both the viscosity and specific gravity of the grey water are significantly different from that of concrete. In particular, as concrete typically has a viscosity on the order of 10 to 100 Pa·s, grey water will typically have a viscosity on the order of 0.001 to 1 Pa·s. Moreover, the specific gravity of concrete is typically above 2.3, whereas the specific gravity of grey water is typically lower than 1.8. This corresponds to a water-to-cementitious ratio above 1.68, which is much higher than the water-to-cementitious ratio of any practical concrete.

The term "submersion fraction" will refer to the fraction of a full vessel rotation that a sensor designed to detect the presence of grey water is submerged within the grey water. The term "inverse fraction" will refer to the fraction of the full vessel rotation that the sensor is not submerged.

The phrase "substantially similar" mixer drums or vessels or "substantially geometrically similar" mixer drums or vessels shall mean mixer drums or vessels where the same grey water volume versus submersion fraction relationship can be used to determine the grey water volume in another mixer drum to within an accuracy of at least 10 gallons, and more preferably 5 gallons. Mixer drums are manufactured by several different companies including McNeilus, Beck, Kimble, Contech, Continential, Schwing, etc. Frequently, mixer drums are welded together by hand, including the fins that are inside the drum to assist in mixing the contents. As such, it is rare to find two identical drums. However, the differences within the same manufacturer's mixer drum model are typically negligible for the purposes herein, and the same grey water volume versus submersion fraction relationship can be used among such drums. Accordingly, once data for grey water volume versus submersion fraction are obtained for one drum, those data can be used as a reference to determine grey water volume in other drums that are substantially geometrically similar. However, two drums from different manufacturers may require separate calibrations, or the inclusion of a factor applied to account for differences in drum configuration.

The term "drum length" will represent the length of the drum [2] along the axis of rotation. The "head" [4] of the drum [2] shall mean side of the drum along the axis of rotation that is open to the air. This opening is where the concrete constituents are batched through. The "tail" [6] of the drum [2] shall mean the side along the axis of rotation that is opposite to the head [4]. In the embodiment shown in FIG. 1, the axis of rotation is shown as the x-axis, the head [4] of the drum is on the far right and the tail [6] of the drum is on the far left next to the motor [10]. The motor [10] that rotates the drum [2] would be located at an x-position of 0. The rectangle with double X's represents the concrete drum hatch [8]. The hatch [8] is a removable section of the drum [2] that allows access into the drum for maintenance purposes.

Figure 2:
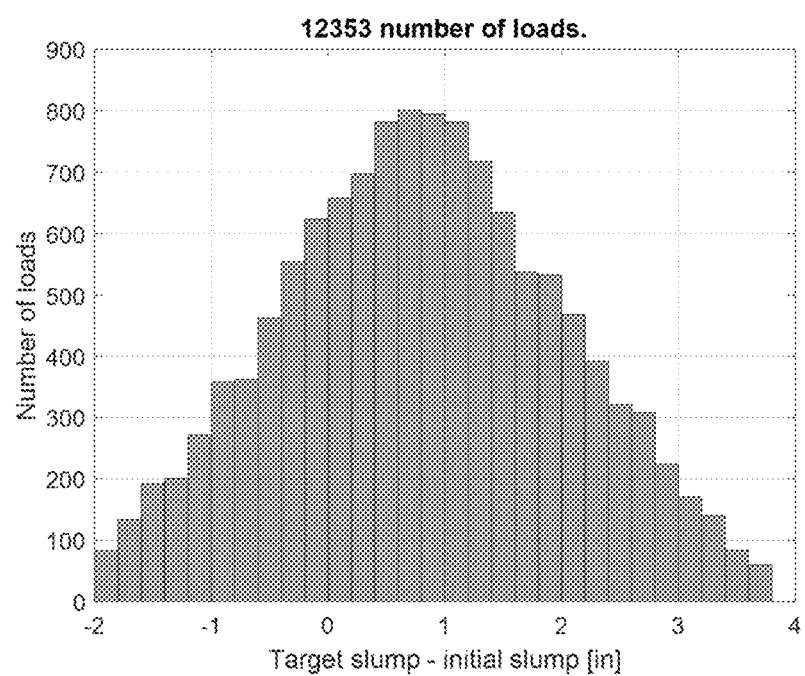
FIG. 2 is a graph of initial slump measurement vs. number of loads for the same mix design in accordance with the prior art.

In FIG. 2, the deviations from the target initial slumps as measured by an automated slump monitoring system are shown over time for the same mix design. At this particular plant, the slump rack was removed and the aggregate moisture meters were considered in working order. The high variability shown is thus a result of the drums not being completely empty either after a load of concrete is delivered and discharged, or after rinsing out the drum after a concrete load is delivered and discharged, thus resulting in the presence of grey water in the drum prior to loading the drum with the next load or batch. These fluctuations in slump due to the remaining drum water also mean that the resulting strength will be highly variable.

Figure 3:
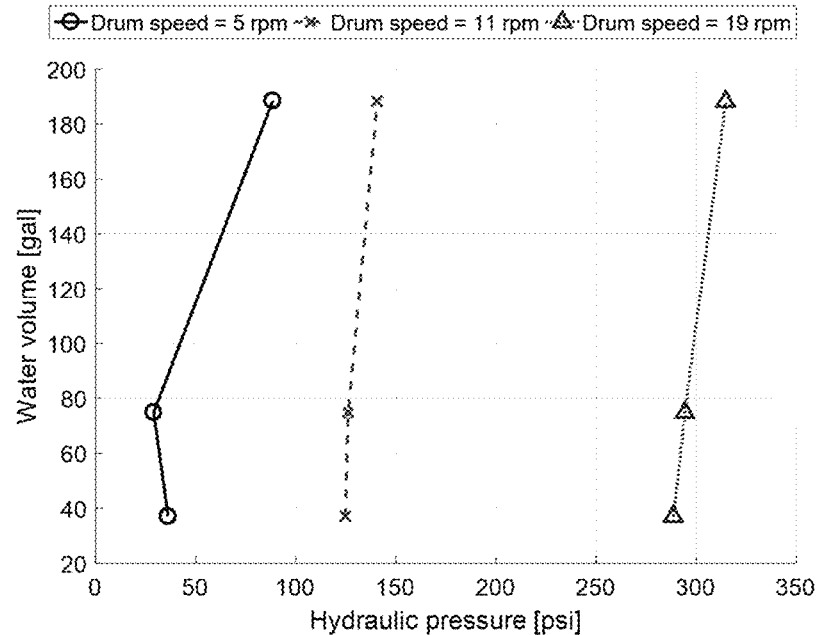
FIG. 3 is a graph of resulting hydraulic pressure differences with varying drum water volume in accordance with the prior art.

Using current automated slump monitoring systems, attempts were made to see if the remaining water could influence the sensor signals currently used to measure slump. In FIG. 3, the hydraulic pressure, which is used to calculated slump as taught by, for example U.S. Pat. Nos. 8,020,431 and 8,746,954, is plotted versus water content. This was done for three different drum speeds: 5, 11 and 19 rpm. For the lowest speed, it can be seen that the relationship between the water volume and hydraulic pressure is not monotonic. Therefore, at a hydraulic pressure around 36 psi, the volume of water could be either 37 gallons or 90 gallons; and consequently, this cannot be used as an estimate of water volume. For higher speeds, the relationship becomes monotonic. Nevertheless, there is very little appreciable change in pressure. For the drum speed of 11 rpm, a 1.1% change in pressure (125 to 126 psi) results in a volume change of 102%. Similarly, for the drum speed of 19 rpm, a 2.0% change in pressure (289 to 294 psi) results in a volume change of 102%. The sensitivity of this method, therefore, is severely limited.

Figure 4:
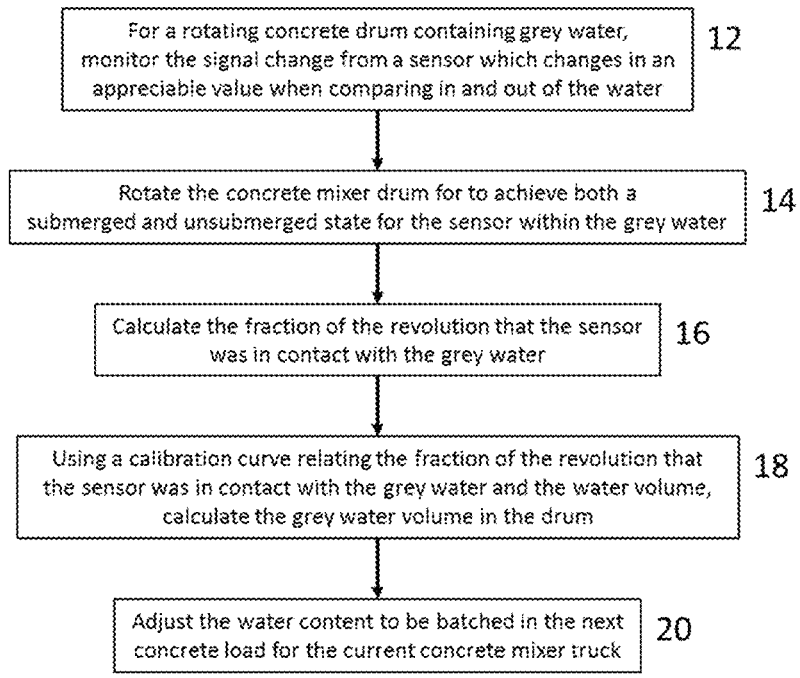
FIG. 4 is a block diagram of a process in accordance with certain embodiments.

In FIG. 4, the process of an exemplary embodiment is presented. In block 12, a sensor attached to a rotatable vessel is monitored as it rotates in and out of the grey water. The vessel must rotate to achieve both a submerged and unsubmerged state for the sensor at least once (block 14). In certain embodiments, the rotating vessel is a concrete mixer drum, such as a mixer drum attached to a truck, such as a ready-mix concrete truck. Alternatively, it can be part of what is known as a wet-batch plant, or central-mix plant, where a large drum mixes the constituents and then dumps the material into either a ready-mix truck or a simple dump truck to be delivered to the job-site. With additional revolutions, the accuracy and repeatability of measurements from the sensor signals in block 14 can be improved. The drum angle between the axis of rotation of the vessel and the horizontal is also recorded during this step. It can be recorded, for example, as the average angle over the revolution. Alternatively, the truck angle with respect to the horizontal can be recorded since the angle between the vessel and the truck is fixed and known or measurable (it is typically about 13 degrees). A simple calculation is required to subtract the angle between the vessel and truck to obtain the absolute angle between the axis of rotation of the vessel and horizontal. Therefore a device that can measure angles with respect to horizontal can either be attached to the mixer drum, or the truck frame, such as an accelerometer.

Figure 5A:
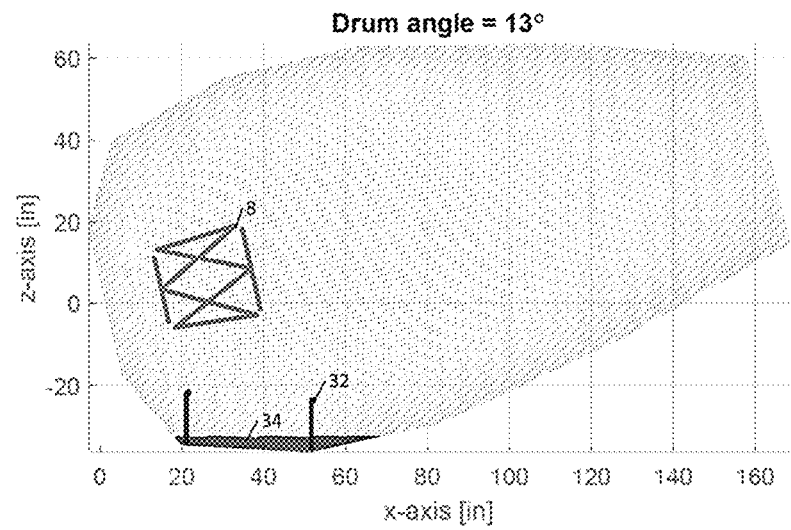
FIGS. 5a and 5b are each graphs showing how drum angles can affect distribution of water within a concrete mixer drum.
Figure 5B:
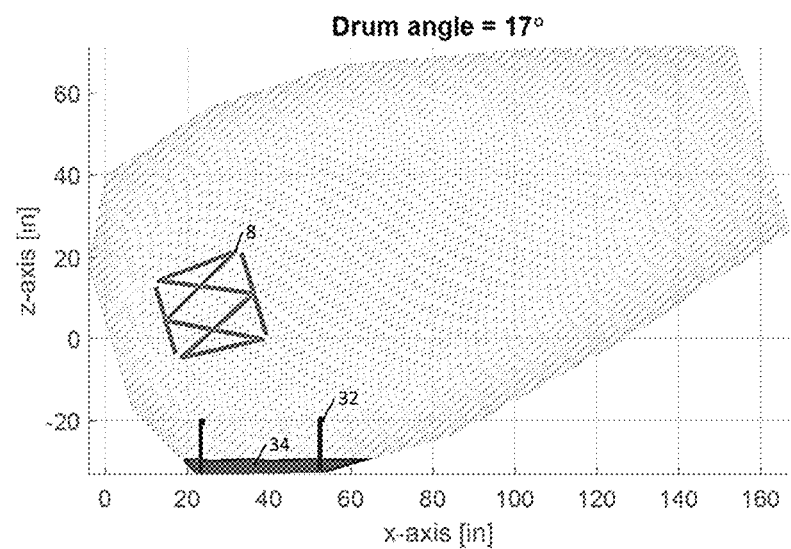
Figure 6:
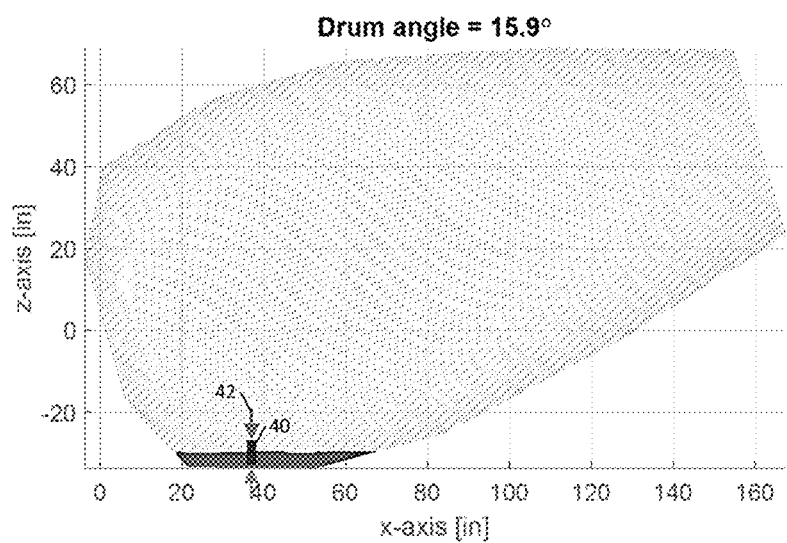
FIG. 6 is a graph showing the location of a sensor in accordance with certain embodiments.

In block 14, the changes in the signal from a water detecting sensor mounted in the interior of a concrete mixer drum, such as on an interior wall or hatch of the mixer drum, are monitored over time or revolutions. In certain embodiments, the sensor may be located in a position along the length of the drum to allow detection of the smallest volume of grey water desired (e.g. 5 gallons). FIG. 5a and FIG. 5b show a drum with two different drum angles. The hatches are designated as [8], the cross-section of the fins are designated as [32] and the grey water is designated as [34]. For a truck whose wheel base is level, and a drum angle of 13° with respect to horizontal (which represents a typical drum angle), this would occur in FIG. 5a at an x-position of around 50. At some concrete production plants, it is common to find a ramp underneath the batch hopper that loads the concrete trucks (typically with a 4° incline). This ramp helps angle the opening of the concrete drum to accept materials being batched. Thus, for a rear-loading concrete truck (where the head of the drum, or the opening of the drum, is rear-facing), the location of the sensor would be closer to the tail of the drum (where the drum would attach to the motor that rotates the drum), as shown in FIG. 5b at an x-position of around 23. In either case, other factors also contribute to the sensor location: ease of sensor installation, relative position to drum fins, and potential for concrete buildup (hardened concrete within the concrete drum frequently resulting from poor drum maintenance), for example. Most preferably, the sensor should lie in the lower third of the drum length (along the x-axis of FIG. 1), closest to the tail (e.g., the lower left side of the drum as depicted in FIG. 1, [4]). For the example concrete drum geometry presented in FIG. 1, a preferred location of the sensor would be attached to the drum surface at an x-position less than approximately 55. Most preferably, the sensor location is on the hatch (depicted in FIG. 1, FIG. 4a and FIG. 4b as the rectangle with double X's) to allow easy installation and maintenance. Aside from location along the length of the drum, the height of the sensor is also important. FIG. 6 shows an example location of the sensor [40], where the height is measured from the internal surface of the drum, which is the distance between the two arrows [42]. Ideally, the sensor should be as close to the internal surface of the drum (i.e. flush with the internal drum surface, height of 0) to detect the lowest level of water. However, mechanical limitations may exist, such as space for electronics, such that the sensor may extend into the interior volume of the drum. Consequently, it is preferred that the sensor height be less than 8 inches, more preferably less than 2 inches and most preferably less than 0.5 inches, measured radially from the drum surface. It is conceivable that buildup of concrete may cover the sensor. However, in this case, the output from the sensor would not change, indicating that the sensor needs to be cleaned.

Suitable sensors require the ability to distinguish between when the sensor is submerged, and when the sensor is unsubmerged. In other words, when the sensor comes into contact with the grey water, the resulting output needs to be distinguished from the output when the sensor is not in contact with the grey water. Thus, a binary signal is suitable to determine contact with water. For example, when submerged, sensors based on electrical resistivity will show a marked decrease in resistivity as grey water is a conductive medium. The absolute measurements are not important, but rather the difference between the two states is. Sensors based on electrical permittivity will show an increase in the dielectric as the sensor comes into contact with grey water. And, sensors designed to measure turbidity would measure a marked increase in turbidity as the sensor comes into contact with grey water. Suitable sensors therefore may take advantage of electrical resistance (see e.g., U.S. Pat. No. 4,780,665), electrical permittivity (see e.g. U.S. Pat. No. 4,438,480) microwaves (see e.g., U.S. Pat. No. 4,104,584), nuclear resonance (see e.g., U.S. Pat. No. 2,999,381), infrared waves (see e.g., U.S. Pat. No. 8,727,608), acoustic waves (see e.g., U.S. Pat. No. 7,033,321) light scatter (see e.g., U.S. Pat. Nos. 2,324,304 and 4,263,511). From the signals, the submersion fraction or inverse fraction can be calculated in several ways. The disclosures of the foregoing patents are hereby incorporated by reference. It is conceivable that multiple sensors can be used to enhance the accuracy of the measurement or to provide redundancy if a single sensor malfunctions. If a redundant sensor fails, the system may detect the malfunction and switch to the alternative sensor and may also alert to the malfunction. These sensors [46 and 48] may be attached, for example, on a hatch [8] in an arrangement shown in FIG. 7. The sensors [46] and

Figure 7:
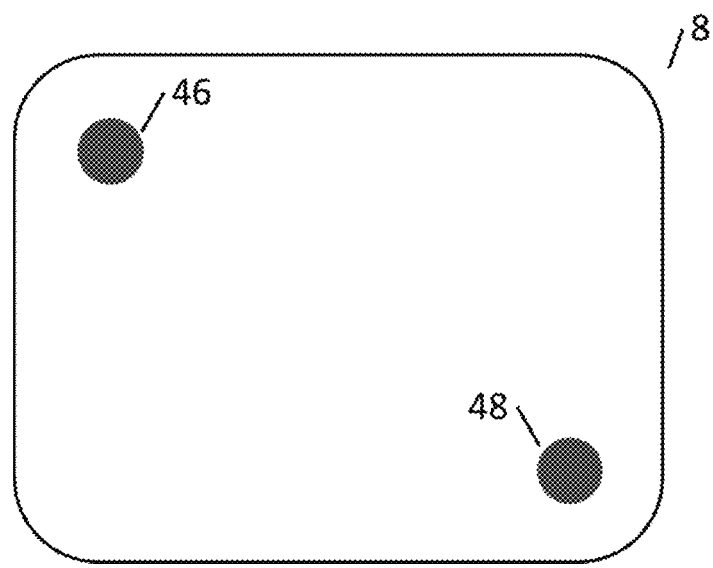
FIG. 7 is a graph showing the plan view of multiple sensors attached to a drum hatch in accordance with certain embodiments.

[48] in the example shown in FIG. 7 can be either the same type of sensor or different. If different types of sensors are used, they may be arranged to be spaced apart to minimize any influence the sensors have on each other's measurements. If there is no interference, for example, because the sensors measure different physical phenomena, they may be spaced closer. Furthermore, such sensors may be powered by different means such as a battery (that may be rechargeable) or a solar panel, or a combination of both.

Figure 8:
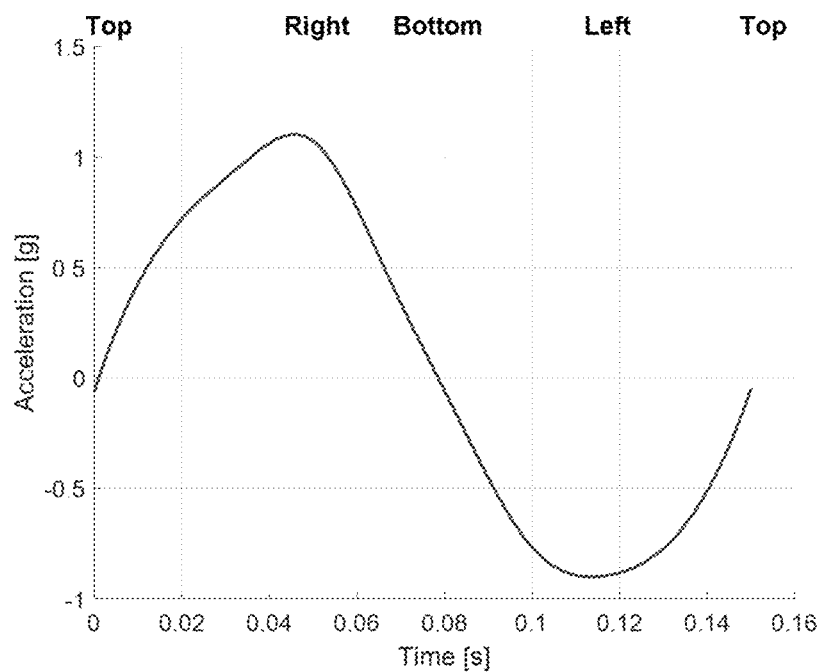
FIG. 8 is a graph of time vs. acceleration, showing the output of an accelerometer mounted on a rotating drum in accordance with certain embodiments.

For example, in certain embodiments the grey water contact information determined from the sensor may be paired with a positioning detecting device, such as a decoder or an accelerometer attached to the surface of the mixer drum, to identify the fraction of a full revolution at which the sensor is in contact with the grey water versus the fraction of a full revolution at which the sensor is not in contact with the grey water. The vertical acceleration (accounting for the effect of gravity) is sinusoidal in nature as the drum rotates. In FIG. 8, the acceleration of an accelerometer fixed onto the surface of a mixer drum in the vertical direction is plotted versus time for one rotation. It can clearly be seen where the accelerometer is moving up, down and at the maximum and minimum points during the rotation. In this figure, the drum is moving clockwise as the viewer is looking into the drum. At a vertical acceleration of 0 (time=0 seconds), the accelerometer is at the top of the drum accelerating only towards the right (and not in the downward direction). At time=0.05 seconds, the accelerometer is at the right most point of the drum, accelerating purely in the downward direction, at a little more than 1 g. At time equal to approximately 0.078 seconds, the accelerometer again is not moving in the up or down direction, but purely towards the left. At time equal to approximately 0.115 seconds, the accelerometer is moving purely up, (opposite of gravity), and finally at time equal to approximately 0.15, the accelerometer shows a completion of the revolution. During the rotation of the concrete drum, the accelerometer will monitor the position of the drum. Because the accelerometer location on the drum is fixed, the distance the physical sensor travels in a rotation is also fixed. During a rotation of the drum, the accelerometer can report the drum positions when the grey water detection sensor signals both the entry and exit into the grey water. Knowing the total distance the accelerometer travels in one full rotation and in comparing the two states of the drum position, the fraction of a full revolution that the grey water sensor is in contact (or is not in contact) with the grey water can be determined directly. Note that the accelerometer does not necessarily need to be in the same location as the grey water detection sensor since the important factor is that a relative difference is taken between the drum states corresponding to the entry and exit events of the sensor in to and out of the grey water. Furthermore, the drum speed does not have to be constant during this process. It is preferable that the submersion fraction or inverse fraction be measured over multiple revolutions such that an average value can be used.

Figure 9:
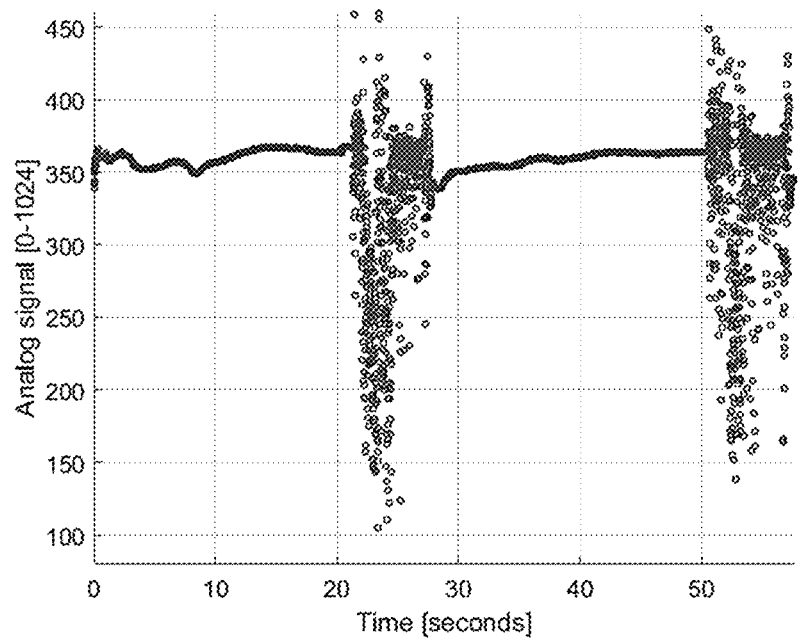
FIG. 9 is a graph of time vs. a sensor analog signal, showing the output of a sensor as it becomes submerged and unsubmerged in grey water in a rotating drum along with output of an accelerometer in accordance with certain embodiments.

In some embodiments, the time the sensor is in contact with the grey water versus the time at which the sensor is not in contact with the grey water can be measured. By calculating the time the sensor is submerged and comparing it with the total time of the drum revolution, for example, the submersion fraction can be calculated (returning to FIG. 4, block 16). In FIG. 9, a sensor reading is shown over time that enters and exits the water in a ready-mix concrete truck with 50 gallons of grey water. For the first rotation, which begins at time 0, the sensor begins out of the water. At approximately 22 seconds, the sensor enters the water, changing the output reading on the sensor (in this case a turbidity sensor). The sensor exits the water at approximately 28 seconds, completing the drum revolution. Therefore, using the time in and out, the percentage in contact with water is (28−22)/(28−0)=21.4%. In this example, the total time for the revolution must be known. This can be determined either by determining the time from one entry event (when the sensor enters into the grey water) to the next entry event (or similarly, one exit event (when the sensor exits from the grey water) to the next exit event). Alternatively, if the drum is known to be moving at a constant speed, and the rotation speed is known, the total time for each revolution is constant (and can be calculated as 1 over the drum speed). In FIG. 9, there is considerable variability in the reading once the sensor is in water. This is due to the waves created by the sensor passing through the fluid. By averaging the result over several revolutions, a more accurate estimate of the water can be obtained. Also, a sensor designed to minimize the wake as the sensor passes through the fluid can decrease the variability in the signal. Alternatively, the variation in the signal can be used as an advantage, noting that the variability in this example significantly increases when in the grey water as compared to in air. Thus, it is conceivable that using a measure of variability such as standard deviation may provide indications to determine when the given sensor is submerged and unsubmerged. Note that in this embodiment, it is most preferable that the drum be moving at a constant speed.

In some embodiments, once the submersion fraction (or inverse fraction) is known, a calibration curve that relates the submersion fraction (or inverse fraction) and the water volume can be used to determine the water volume in the mixer drum (returning to FIG. 4, block 18). This calibration curve can be derived in several ways. One is to use the geometry of the concrete mixer drum and probe location within the drum (including the height of the sensor compared to the surface of the drum) to derive the volume of grey water in the drum based directly on the fraction of the revolution in which the sensor is in contact with the grey water at a given point on the concrete mixer drum and the drum angle with respect to horizontal. For example, a three-dimensional computer-aided design (CAD) model can be created, reflecting the size and shape of a concrete mixer drum. In addition to the shell of the drum, fins that may be present in the drum to aid in mixing may be included as well. This can be done by using blueprints from the actual drum design (available from the manufacturer), making physical measurements of the drum, or using a laser scanner to take measurements of the drum. Within the three-dimensional model, a model of the sensor can be inserted with a specified location and height. The entire model (drum and sensor) can be tilted to represent different drum angles (angle between axis of rotation and horizontal). Based on the tilt, a level surface can be inserted into the model, representing a surface of the grey water. The volume of the grey water for a particular surface height within the model of the drum can be calculated using standard volume methods frequently provided by CAD software. For the given volume of water, the model can be rotated about the drum axis of rotation (for example, the model can be redrawn for every 1° rotation). The sensor location can be tracked throughout the rotation and the drum rotation position can be identified when the sensor contacts the grey water surface. Using this information, the fraction of the full revolution that the sensor is submerged beneath the grey water surface can be determined. This can be repeated for a plurality of grey water volumes to create a volume versus fraction of a full revolution calibration curve using conventional curve-fitting methods. Alternatively, a lookup table can also be created.

Another method to construct a calibration curve to determine the volume of grey water is to create a database of submersion fractions (or inverse fractions) and the corresponding known water volumes, and from this database, an empirical relationship can be created to predict the water volume based on a percentage of a revolution in which a sensor is in contact (or is not in contact) with the grey water. For example, a concrete mixer drum can be filled with a series of known different volumes of water (which can easily be supplied at a concrete production facility). For each volume of water, the mixer drum can be rotated preferably more than once while recording sensor output. After which, the data can be analyzed to determine the fraction of a full revolution corresponding to each of the known volumes. With this information, a calibration curve can be created using any conventional curve-fitting methods. Alternatively, a lookup table can also be created.

Either of these methods to correlate the sensor measurement with the volume of water can be supplemented with information about the surface area of the drum. That is, once the drum becomes wet after the first batching, water may reside on the interior surface of the drum. This may be non-negligible as the surface area of a ready-mix truck can be large. In practice, a simple wet or dry state can be used with the water for a wet state measured either through measuring the weight of the truck or drum before and after wetting or simply assuming an amount of water adhering to a unit surface area of metal (e.g. 200 grams per square meter). Note that this water attached to the surface remains on the surface and does not get discharged. As such, it is it is not part of the "grey water" and is more of a factor for the first load batched into the dry drum. Extra water will need to be added to compensate for this. This is a reason why frequently the first load of the day for a given truck has a lower slump. For example, the surface area of the concrete mixer drum in FIG. 1 has a surface area of approximately 302 square feet. Assuming that the internal surface has a water adherence of 0.05 pounds per square foot, the internal surface of the drum would include approximately 2 gallons of water. Thus, for the first batch of concrete, an additional 2 gallons of water should be added if the internal drum surface is dry. Another consideration is the buildup of hardened concrete within the drum. This frequently occurs due to poor maintenance, hot weather (causing the concrete to cure quicker), or mix designs containing hydration accelerators. If buildup of hardened concrete within the drum has been determined to be significant for a particular drum (for example, a visual inspection of the drum may reveal significant buildup), information from the grey water sensor can be modified or disregarded. If the grey water sensor is covered with hardened concrete, it is likely that the output throughout the entire revolution will not change dramatically, even when the drum is intentionally filled with water or concrete. This signal can be used to alert that the concrete buildup has occurred and that the grey water sensor needs to be cleaned. Alternatively, the buildup measurement can turn off the grey water measurement if the buildup exceeds a predefined limit. With the actual grey water content known, an alert can be sent if the measured grey water content exceeds a pre-defined limit, such as 20 gallons, or more preferably 10 gallons or most preferably 5 gallons. Instead of, or in addition to the alert, the water content to be batched for the next immediate load for the same current concrete mixer drum mixer truck can be appropriately adjusted (block 20). After which, the batch man, quality control manager or other coordinator can be alerted of the change. Alternatively, or in addition to, the batched materials for the next concrete load into the current concrete mixer drum can be adjusted based on the grey water content. For example, the water to be batched can be decreased by the amount measured. Alternatively, the amount of cement can be increased in order to, for example, keep the designed ratio between water and cement. It is also conceivable that admixtures may be added to compensate the additional water detected by the grey water sensor. Alternatively, the grey water can be discharged from the concrete mixer drum.

In some embodiments, a processing unit may be provided, the processing unit having a storage element. The processing unit may be a general purpose computing device such as a microprocessor. Alternatively, it may be a specialized processing device, such as a programmable logic controller (PLC). The storage element may utilize any memory technology, such as RAM, DRAM, ROM, Flash ROM, EEROM, NVRAM, magnetic media, or any other medium suitable to hold computer readable data and instructions. The processing unit may be in electrical communication (e.g., wired, wirelessly) with a sensor capable generating a signal indicative of when it is submerged in water and a different signal indicative of when it is not submerged in water. The processing unit also may be in electrical communication (e.g., wired, wirelessly) with a position determining device such as accelerometer capable of generating a signal indicative of the position of the vessel such as a concrete mixer drum. The processor also may be associated with a human machine interface or HMI that displays or otherwise indicates to an operator the determined volume of grey water in the vessel. The storage element may contain instructions, which when executed by the processing unit, enable the system to perform the functions described herein. In some embodiments, the calibration curve may be stored within the memory data. It can be stored, for example, as a table, an equation or a set of equations. In some embodiments, the geometry of the mixer drum can be stored in the memory data. In some embodiments, more than one processor can be used, such as for example, a processor in communication with a sensor capable generating a signal indicative of when it is submerged in water and a different signal indicative of when it is not submerged in water, and a separate processor in communication with a position determining device.

The rate at which the data is collected also may be considered in order to achieve acceptable accuracy. The slope of the fluid volume versus submersion fraction of a revolution as constructed in accordance with embodiments disclosed herein increases as the submersion fraction of a revolution increases. In other words, at low fractions, for relatively large changes in the submersion fraction, relatively small changes in the fluid volume occur. On the other hand, at high fractions, for relatively small change in the submersion fraction, large changes in volume is experienced (the slope of the fluid volume—submersion fraction curve is steeper). In practice, the sensor output is recorded at a given interval. Between the actual measurements, it is unknown whether a change in the submersion state of the sensor has occurred. One remedy is to make measurements on smaller time intervals. Based on the sensor, this can dramatically increase the power requirement. Therefore, it is desired to have the lowest data collection rate for a given accuracy. Using the mixer drum speed, the angle that the drum rotates for a given time interval can be calculated. For example, at a drum speed of 2 rpm, the drum rotates 12 degrees per second. If data was collected every second, there would be 12 degrees of uncertainty of whether the sensor was in or out of the water. This is 3.33% of the total rotation. For a drum speed of 20 rpm, the drum rotates 120 degrees per second. If data was collected every second, there would be a third of a full rotation where it would be uncertain if the sensor was in or out of the grey water. Thus it is preferred that for drum rotational speeds less than or equal to 2 revolutions per minute, the sensor makes at least 5 measurements per second, and more preferably 10 measurements per second and most preferably 20 measurements per second. For drum rotational speeds less than or equal to 6 revolutions per minute but greater than 2 revolutions per minute, the sensor makes at least 15 measurements per second, and more preferably 30 measurements per second and most preferably 60 measurements per second. And for drum rotational speeds greater than 6 revolutions per minute but greater than 6 revolutions per minute, the sensor makes at least 50 measurements per second, and more preferably 100 measurements per second and most preferably 200 measurements per second.

Figure 10:
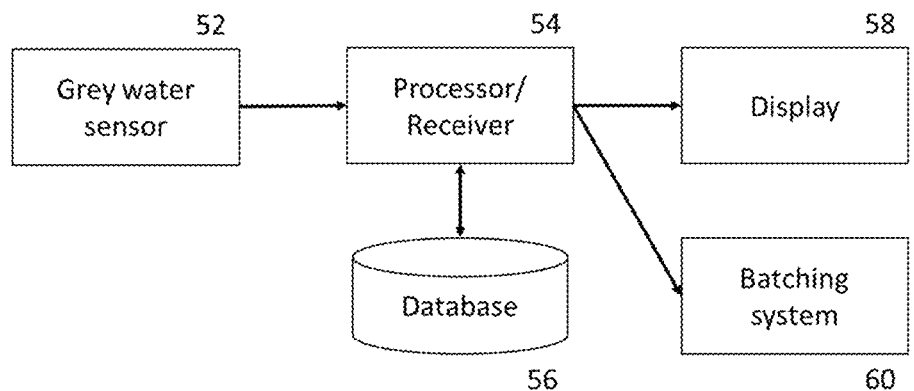
FIG. 10 is a block diagram of certain components of a system in accordance with certain embodiments.

In FIG. 10, the system of an exemplary embodiment is presented. In block 52, the measurements from a grey water sensor are sent to a processor/receiver in block 54. This processor/receiver then retrieves a calibration curve from a database in block 56. With the measurement reading and the calibration curve, a grey water volume is calculated. This value can then be sent to a display or other alert mechanisms, shown in block 58. Alternatively, or in addition to, the grey water volume is sent to the batching system. Here the water amount, cement amount, admixture amount or combinations thereof can be adjusted for the next batch into the current concrete mixer drum.

While embodiments are described herein using a limited number of embodiments, these specific embodiments are not intended to limit the scope of the invention as otherwise described and claimed herein. Modifications and variations from the described embodiments exist. More specifically, the following examples are given as a specific illustration of embodiments of the claimed invention. It should be understood that the invention is not limited to the specific details set forth in the examples.

Example 1

Figure 11A:
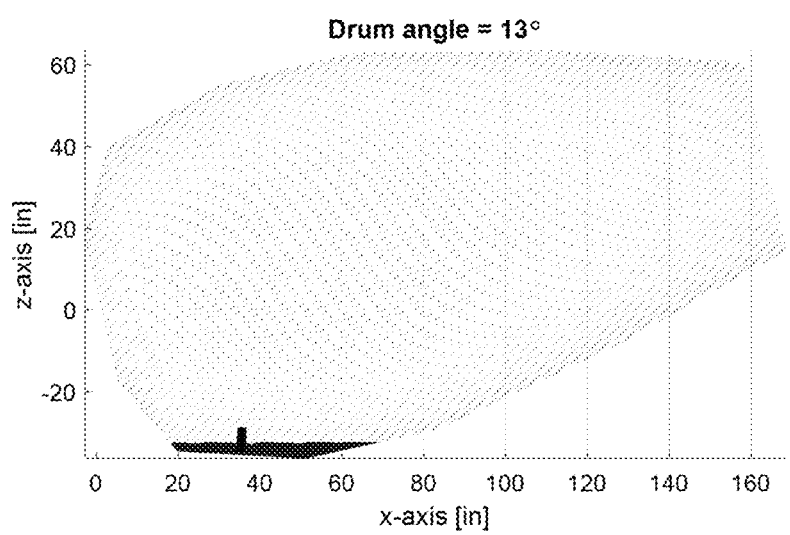
FIGS. 11a and 11b are each graphs showing an exemplary process of certain embodiments where a probe is in contact with water in a concrete mixer drum.
Figure 11B:
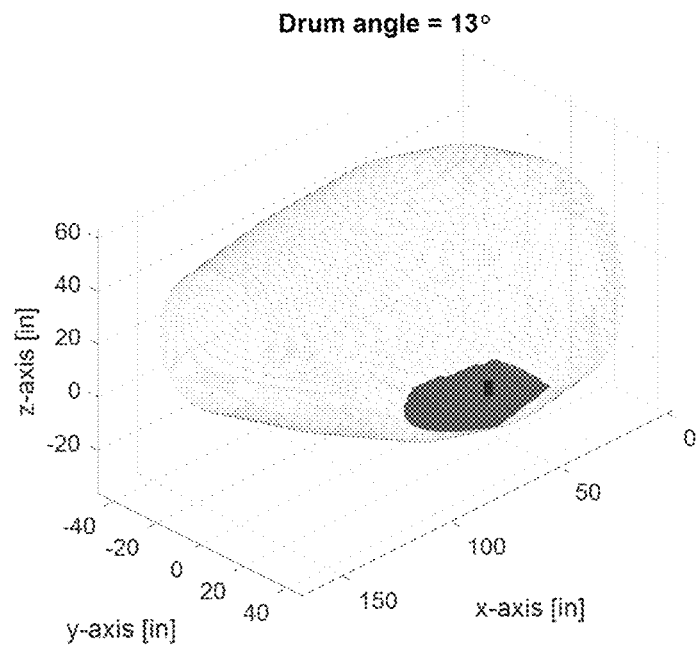
Figure 12A:
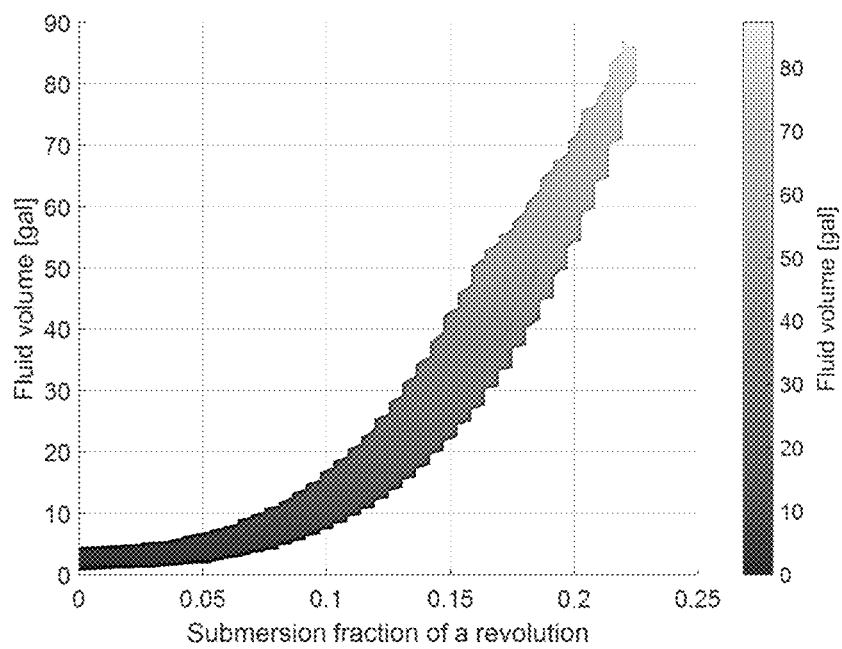
FIG. 12a is a graph of submersion fraction of a full revolution vs. fluid volume, showing a relationship between the volume of water detected in a concrete mixer drum, and the fraction of the vessel revolution in which the probe is in contact with water, based on the geometry of the drum, in accordance with certain embodiments.
Figure 12B:
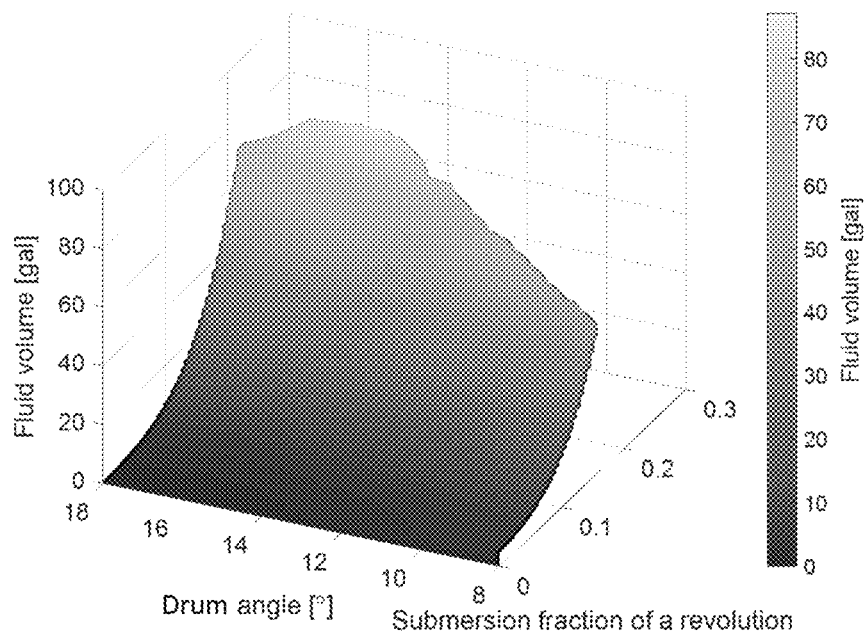
FIG. 12b is a graph of submersion fraction vs. fluid volume, showing a relationship between the volume of water detected in a concrete mixer drum, the truck angle, and the fraction of the vessel revolution in which the probe is in contact with water, based on the geometry of the drum, in accordance with certain embodiments.

A three-dimensional mixer drum model was created using measurements of an actual concrete drum. A model sensor was implemented into the mixer drum model, located in the center of the mixer drum hatch. The entire model (drum and sensor) was tilted initially at 13° from horizontal, representing what is typically seen in the field. Based on this tilt, a surface representing the surface of grey water contained within the drum was implemented at various heights with respect to the lowest point of the mixer drum. For each of the various heights, the volume between the level surface and the surface of the concrete drum could be calculated using a three-dimensional Riemann sum method. At each surface height, the mixer drum was rotated computationally, tracking the location of the sensor with respect to the surface height. In this manner, the drum positions when the sensor was submerged beneath the surface could be determined. Consequently, the fraction of a full revolution that the sensor was beneath the surface was determined for each surface height, which in turn was associated with a volume. Thus a relationship between volume and fraction of a full revolution that a sensor was in contact with the grey water could be created. This process was repeated for different drum angles. In FIGS. 11a and 11b, the location of an example sensor is shown within a concrete mixer drum, in contact with a known volume of water (15 gallons of grey water). The profile of the concrete drum is shown in FIG. 11a, while a three-dimensional model is shown in FIG. 11b. In this example, the sensor is attached to the center of the concrete mixer drum hatch at a height of 6 inches. Although the sensor does not have to be located on the drum hatch, this location provides easy access to the sensor for maintenance purposes. Also, often, the hatch is in the proper location to guarantee that the sensor will rotate in and out of the water for small volumes of grey water (i.e. if the sensor lies near the opening of the drum, it is unlikely the sensor will rotate into (and out of) a small volume of grey water). If the axis of rotation of the concrete mixer drum is tilted, the profile of the grey water would change. In FIG. 12a, the geometry of the drum was used along with the angle between axis of rotation of the concrete mixer drum and the horizontal to determine the relationship between the fraction of a full revolution in which a sensor mounted in a location depicted in FIGS. 12a and 12b and the volume of grey water in the drum. The relationship is not a single line, but a region due to the effect of the truck angle, which is shown in FIG. 11b. If this angle is known, the relationship between volume and fraction of a full revolution approaches a single line, as shown in FIG. 13.

Example 2

Figure 13:
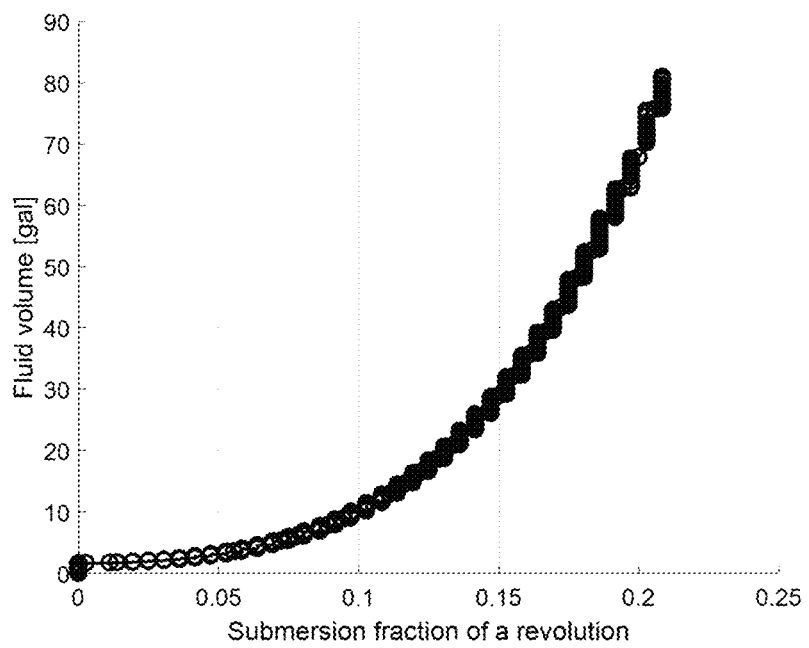
FIG. 13 is a graph of submersion fraction of a full revolution vs. fluid volume, showing a relationship between the volume of water detected in a concrete mixer drum and the fraction of the vessel revolution in which the probe is in contact with water, based on the geometry of the drum for a single drum angle, in accordance with certain embodiments.
Figure 14A:
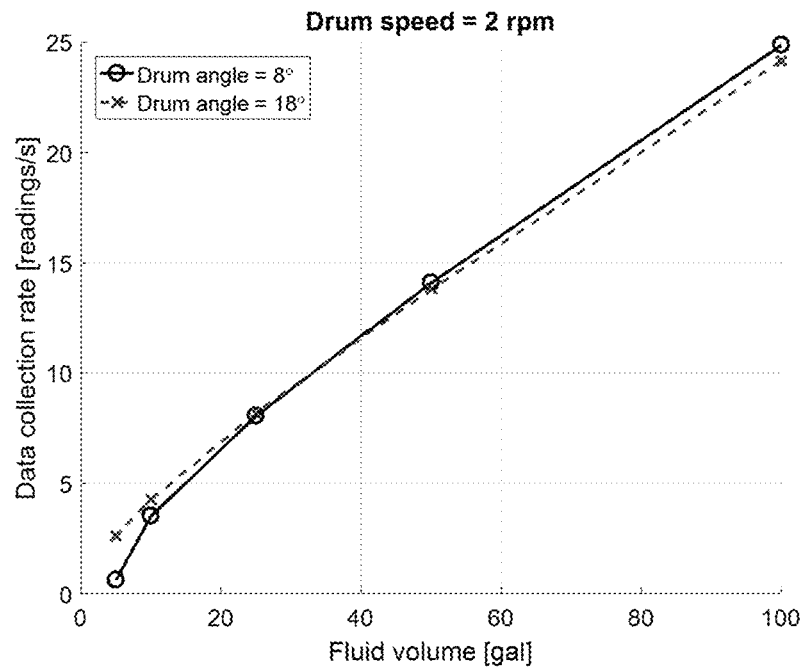
FIG. 14a is a graph of fluid volume vs. data collection rate, showing a relationship between the data collection rate based on the fluid volume for two drum angles with an accuracy of 2 gallons at a drum speed of 2 rpms in accordance with certain embodiments.
Figure 14B:
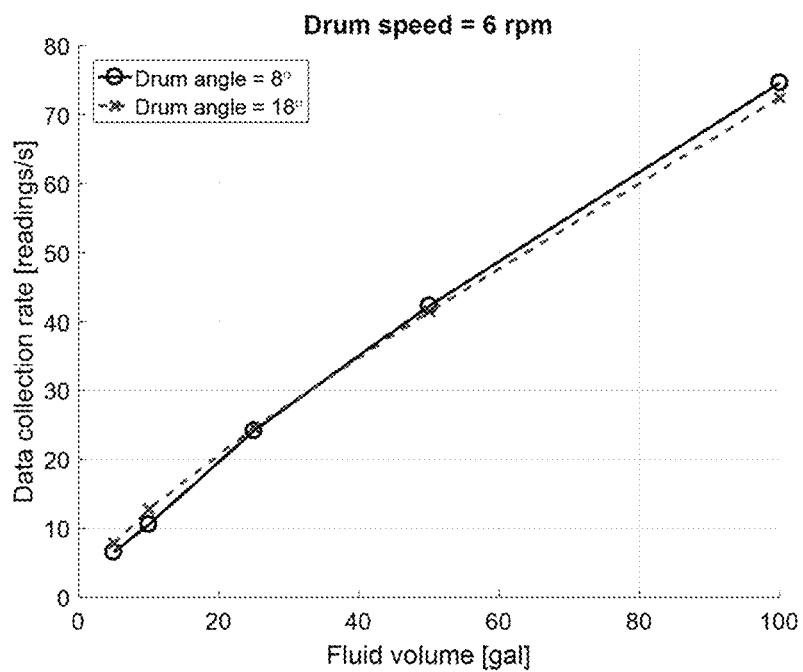
FIG. 14b is a graph of fluid volume vs. data collection rate, showing a relationship between the data collection rate based on the fluid volume for two drum angles with an accuracy of 2 gallons at a drum speed of 6 rpms in accordance with certain embodiments.
Figure 14C:
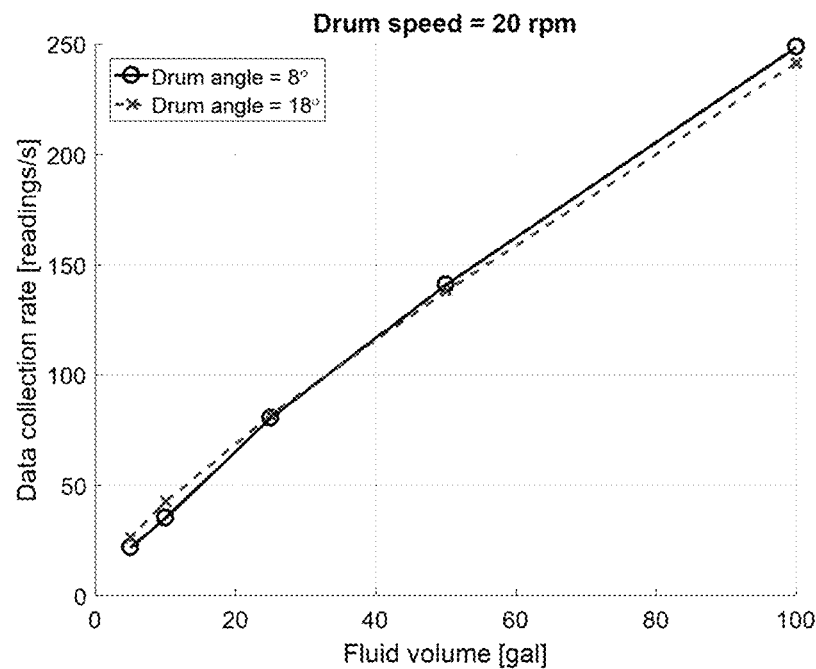
FIG. 14c is a graph of fluid volume vs. data collection rate, showing a relationship between the data collection rate based on the fluid volume for two drum angles with an accuracy of 2 gallons at a drum speed of 20 rpms in accordance with certain embodiments.

In FIGS. 14a, 14b and 14c, the data collection rate is calculated by using a fluid volume—submersion fraction relationship found in FIG. 13. In FIG. 13, for example, if the actual submersion fraction is 0.15, and the measurement is made once a second, the measured submersion fraction could be anywhere from 0.12 to 0.18. Using FIG. 13, a submersion fraction ranging between 0.12 and 0.18 translates to a fluid volume between 24.5 gallons and 69 gallons. For different total fluid volumes, the submersion fraction resolution is derived to achieve an accuracy of, for example, 2 gallons. Then, combining this data with the drum speed, the number of readings required to achieve the submersion fraction resolution is calculated. As it can be seen in FIG. 14a, to achieve a 2 gallon resolution, nearly 25 readings per second need to be captured for a drum speed of 2 rpm. In FIG. 14b, to achieve a 2 gallon resolution, nearly 75 readings per second need to be captured for a drum speed of 6 rpm. For a drum speed of 20 rpm, the number of readings per second is nearly 250 as seen in FIG. 14c. The drum angle does not have a large effect in any of these cases. From a practical point, it is sufficient for a given desired accuracy, e.g. 2 gallons, to set the data collection speed to be one value (e.g. 250 readings per second).

Example 3

Figure 15:
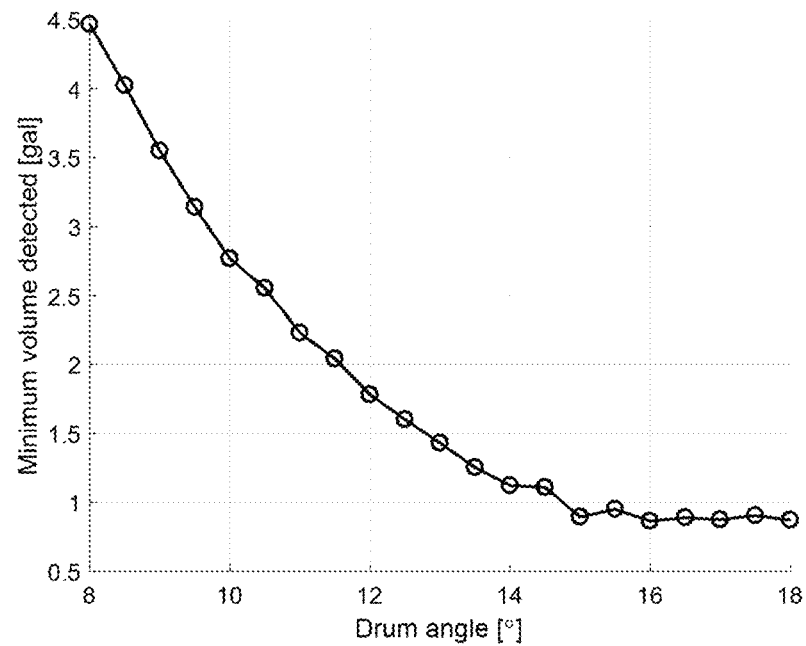
FIG. 15 is a graph of truck angle vs. minimum volume detected in accordance with certain embodiments.

The attached location of the probe within the mixer drum along with the truck angle determines the minimum volume detectable by the sensor. The height at which the sensor is located above the interior surface of the drum also dictates the minimum volume (the higher the sensor, the larger the minimum volume). FIG. 15 shows the effect of truck angle on the minimum volume detected for a probe attached to the middle of the mixer drum hatch for this given drum geometry and a sensor height of 6 inches from the interior of the drum. Knowing this information can be included in a grey water measurement; for example, even if no water is detected by the sensor, the minimum volume can be used a conservative estimate with which to adjust the next concrete load to be batched. However, it would be more preferred to have a sensor height as low as possible without having issues with concrete build up.

Example 4

Figure 16:
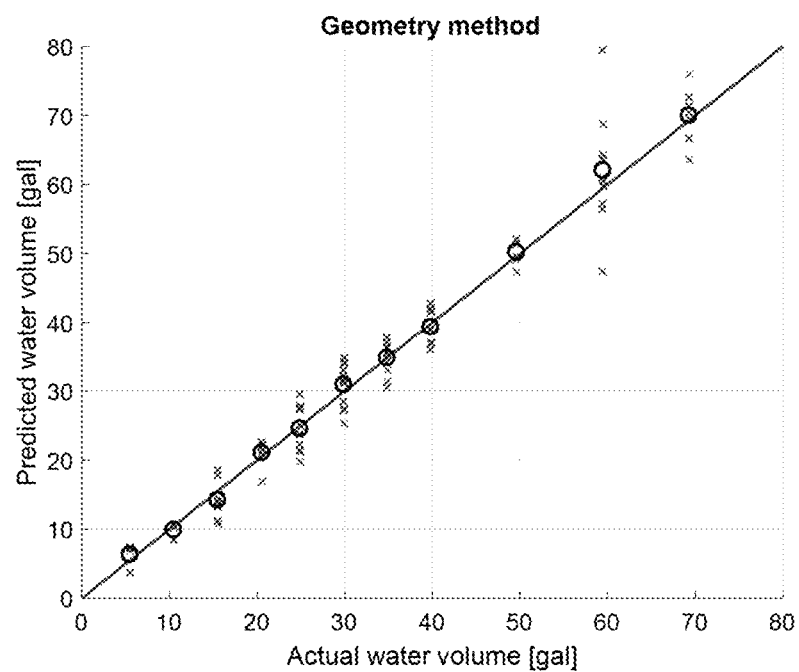
FIG. 16 is a graph of actual water volume vs. predicted water volume, where the water content is determined using a which the probe is in contact with water, based on the geometry of the drum, in accordance with certain embodiments.

A water meter consisting of a turbidity sensor (based on ISO 7027:1999) was attached to the interior of a concrete mixer drum at a height of 1 inch from the internal surface of the drum. The time in and out of the water also calculated by knowing the drum speed. Based on the geometry of the drum shown in FIG. 11a and the tilt of 13° of the axis of rotation of the concrete mixer drum to horizontal, the volume of water could be calculated based on the results from the water meter and the time fraction, similar to what was presented in FIG. 13. The actual equation used was $V=-8.76-166\times F+0.11.1\times \exp(10.774\times F)$, where V is the volume of grey water, F is the time submersion fraction and exp is exponential function. The volume of water was increased several times, while the fraction was calculated from an average of at least three revolutions and presented in FIG. 16. Both the results from a single revolution as well as the results from the average of several revolutions is plotted to show the improvement upon the prediction of the grey water volume. As can be seen, the predicted water volume from the time fraction method agree to the actual water volumes.

Example 5

Figure 17:
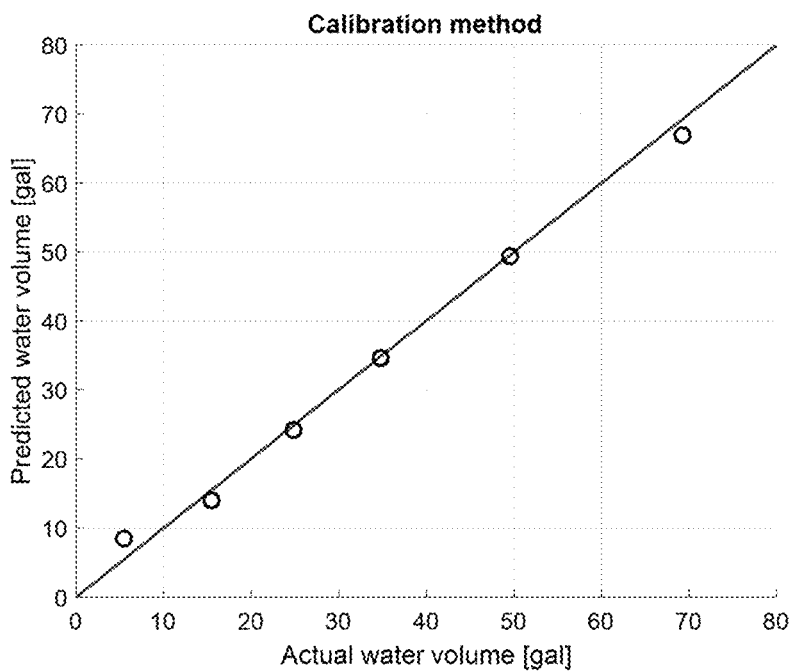
FIG. 17 is a graph of actual water volume vs. predicted water volume, where an empirical relationship between water content and water meter readings is used to determine the water content remaining in a concrete mixer drum in accordance with certain embodiments.

In Example 5, the concrete mixer drum geometry was assumed to be unknown and the results of Example 4 were split into two groups: 6 data points to create an empirical calibration and 5 data points to test the calibration. A regression analysis using a polynomial of order 2 was used to create a calibration curve between the fraction of time the sensor was in the water and the actual water volume. This equation was found to be $V=35.5-620\times F+3530\times F^2$, where V is the volume of grey water and F is the time submersion fraction. This best-fit was then applied to the remaining 5 points, resulting in FIG. 17, showing the predicted versus actual water volumes based on the calibration. Again, the prediction is able to match the actual water volumes. It should be noted that in this example, a polynomial function ($2^{nd}$ order) was used, while in Example 4, an exponential function was used. This illustrates that both can fit the shape of the data making up the relationship between volume and submersion fraction with the appropriate function coefficients. Other functions may fit the shape of the data as well.

The present embodiments are described herein using a limited number of illustrative embodiments not intended to limit the scope as otherwise described and claimed herein.

What is claimed is:

1. A method for determining the grey water content remaining in a mixer drum from a previous concrete load that has been discharged from said mixer drum to provide accurate batching of a new concrete load into said mixer drum, said method comprising:
   (A) providing a concrete mixer drum having an interior volume and an axis of rotation;
   (B) providing at least one sensor mounted in a location in said interior volume of said mixer drum such that during a revolution of said mixer drum, the sensor separately achieves both a submerged state in any water in said interior and an unsubmerged state and generates a signal indicative of each said state;
   (C) rotating the concrete mixer drum such that the sensor separately achieves both a submerged state in any water in said interior and an unsubmerged state;
   (D) determining the angle between the axis of rotation of the concrete mixer drum and horizontal;
   (E) determining the submersion fraction or inverse fraction that the sensor achieves based on the rotation of Step (C);
   (F) providing data correlating the submersion fraction or inverse fraction to the corresponding volume of water in a vessel that is substantially geometrically similar to said mixer drum;
   (G) determining the grey water content in said mixer drum by comparing the submersion fraction determined in Step (E) with said data of Step (F) and the angle between the axis of rotation of the concrete mixer drum and horizontal determined in Step (D); and either
   (H) creating an alert if the grey water content detected is greater than a pre-defined limit, modifying the percentage of water in said new concrete load, based upon the grey water content determined in step (G), discharging at least a portion of the grey water from said mixer drum based upon the grey water content determined in step (G), or a combination thereof.

2. The method of claim 1, wherein said concrete mixer drum is mounted on a truck.

3. The method of claim 1, wherein said at least one sensor is an electrical resistivity sensor, an electrical capacitance sensor, an acoustic sensor, a microwave sensor, a nuclear resonance sensor, or a light sensor.

4. The method of claim 1, wherein said mixer drum has a length and a motor for rotating said mixer drum, and wherein said at least one sensor is located in the bottom third along the length of the mixer drum, closest to said motor.

5. The method of claim 1, wherein said at least one sensor is located less than 8 inches from the internal surface of the mixer drum.

6. The method of claim 1, wherein said at least one sensor is located less than 2 inches from the internal surface of the mixer drum.

7. The method of claim 1, wherein said at least one sensor is located less than inches from the internal surface of the mixer drum.

8. The method of claim 1, wherein said at least one sensor makes a measurement at least 5 times per second for drum rotational speeds less than or equal to 2 revolutions per minute.

9. The method of claim 1, wherein said at least one sensor makes a measurement at least 15 times per second for drum rotational speeds less than or equal to 6 revolutions per minute but greater than 2 revolutions per minute.

10. The method of claim 1, wherein said at least one sensor makes a measurement at least 50 times per second for drum rotational speeds greater than 6 revolutions per minute.

11. The method of claim 1, wherein the angle determined in Step (D) is provided by an accelerometer mounted on the drum.

12. The method of claim 1, wherein the submersion fraction or inverse fraction determined in Step (E) is based on the variability of the sensor output.

13. The method of claim 1, wherein the submersion fraction or inverse fraction determined in Step (E) is based on the time the sensor detects grey water compared to the total time to complete a drum revolution.

14. The method of claim 13, wherein the total time to complete said revolution is based on the mixer drum revolution speed.

15. The method of claim 1, wherein the submersion fraction determined in Step (E) is based on the distance said at least one sensor traveled while detecting grey water compared to the total distance traveled to complete a drum revolution.

16. The method of claim 15, wherein the position of said at least one sensor is determined by an accelerometer mounted to the mixer drum.

17. The method of claim 1, wherein the data generated in Step (F) is based on a collection of data representing the geometry of the mixer drum and location of said at least one sensor in three-dimensions.

18. The method of claim 1, wherein the data generated in Step (F) is based on sensor outputs corresponding to at least two measured volumes of water in said substantially geometrically similar vessel.

19. The method of claim 1, wherein the grey water content is determined based on at least three successive rotations of the mixer drum.

20. The method of claim 1, wherein said mixer drum has an interior surface, said method further comprising determining the amount of water adhering to said interior surface of said mixer drum, and modifying the amount of grey water content determined in step (G) based upon said determination.

21. The method of claim 1, further comprising determining the amount of hardened concrete built up within said mixer drum, and modifying the amount of grey water content determined in step (G) based upon said determination.

22. The method of claim 1, wherein said new concrete load comprises water and cement, and wherein said percentage of water in said new concrete load is modified by adjusting the water content, the cement content, or both.

23. A method of determining the volume of grey water remaining in a vessel having an interior volume and an axis of rotation after a first cement load has been discharged from said vessel, said method comprising:
   rotating said vessel at least one complete revolution and determining the angle of the axis of rotation of said vessel with respect to horizontal;
   providing at least one sensor in said interior volume positioned so as to be submerged in the grey water in said vessel during a first portion of said one complete revolution and not submerged in the grey water in said vessel during a second portion of said one complete revolution, said at least one sensor generating a first signal when it is submerged and a second signal when it is not submerged;
   determining the ratio of either said first portion or said second portion to said one complete revolution;
   determining the angle between the axis of rotation of the concrete mixer drum and horizontal;
   comparing said ratio to a predetermined ratio indicative of the volume of grey water in said vessel; and
   modifying the percentage of water in a second cement load to be loaded into said vessel based on said comparison and said angle between the axis of rotation of the concrete mixer drum and horizontal.

24. A method of determining the volume of grey water remaining in a vessel having an interior volume and an axis of rotation after a first cement load has been discharged from said vessel, said method comprising:
   rotating said vessel at least one complete revolution and determining the angle of the axis of rotation of said vessel with respect to horizontal;
   providing at least one sensor in said interior volume positioned so as to be submerged in the grey water in said vessel during a first portion of said one complete revolution and not submerged in the grey water in said vessel during a second portion of said one complete revolution, said at least one sensor generating a first signal when it is submerged and a second signal when it is not submerged;
   determining the ratio of either said first portion or said second portion to said one complete revolution;
   comparing said ratio to a predetermined ratio indicative of the volume of grey water in said vessel; and
   discharging at least a portion of said grey water from said vessel based on said comparison and said angle of the axis of rotation.

25. A system for determining the volume of grey water remaining in a vessel having an interior volume and an axis of rotation after a first cement load has been discharged from said vessel, said system comprising:
   a motor for rotating said vessel at least one complete revolution so that the angle of the axis of rotation of said vessel with respect to horizontal can be determined;
   at least one sensor in said interior volume of said vessel positioned so as to be submerged in the grey water in said vessel during a first portion of said one complete revolution and not submerged in the grey water in said vessel during a second portion of said one complete revolution, said at least one sensor generating a first signal when it is submerged and a second signal when it is not submerged;
   a positioning determining device or a time determining device for determining a submersion fraction that is the portion of a full revolution at which the sensor is submerged or the portion of a full revolution at which the sensor is not submerged;
   a processor in communication with said at least one sensor to receive said first and second signals and with said positioning detecting device or said time determining device and configured to calculate a ratio of said first portion or said second portion to said one complete revolution and determine a volume of grey water in said vessel based on said ratio and said angle of said axis of rotation.

26. The system of claim 25, further comprising a memory in communication with said processor, said memory containing a calibration curve correlating ratios of a submersion fraction to respective volumes of water, wherein said processor uses said calibration curve to determine said volume of grey water in said vessel based on said ratios.

27. The system of claim 25, further comprising a memory in communication with said processor, said memory containing a geometric representation of said vessel, wherein said processor determines said volume of grey water using said geometric representation.

28. The system of claim 25, wherein said vessel is a concrete mixer drum.

29. A system for determining the grey water content remaining in a vessel having an interior volume and an angle between an axis of rotation of said vessel and horizontal after a first cement load has been discharged from said vessel, said system comprising:
   a rotatable concrete mixer drum having an interior volume;

at least one sensor in said interior volume of said rotatable concrete mixer drum and positioned such that during a revolution of said rotatable concrete mixer drum, the at least one sensor separately achieves both a submerged state in water in said interior volume and an unsubmerged state and generates a signal indicate of each such state;

a position determining device or a time determining device for determining a submersion fraction that is the portion of a full revolution at which the sensor is submerged or the portion of a full revolution at which the sensor is not submerged; and a processor having a memory containing instructions, which when executed by said processor, allow the system to:

determine the submersion fraction of a revolution of said rotatable concrete mixer drum during which said sensor is in said submerged state or determine the inverse submersion fraction of a revolution of said rotatable concrete mixer drum during which said sensor is in said unsubmerged state; correlate the submersion fraction or inverse submersion fraction to a corresponding volume of water in a vessel that is substantially geometrically similar to said concrete mixer drum; and determine the volume of grey water in said concrete mixer drum based on said correlation and the angle between said axis of rotation of said rotatable drum and horizontal.

30. A system for determining the volume of grey water remaining in a vessel having an interior volume and an axis of rotation after a first cement load has been discharged from said vessel, said system comprising:

a motor for rotating said vessel at least one complete revolution so that the angle of the axis of rotation of said vessel with respect to horizontal can be determined;

at least one sensor in said interior volume of said vessel positioned so as to be submerged in the grey water in said vessel during a first portion of said one complete revolution and not submerged in the grey water in said vessel during a second portion of said one complete revolution, said at least one sensor generating a first signal when it is submerged and a second signal when it is not submerged;

a positioning determining device or a time determining device for determining a submersion fraction that is the portion of a full revolution at which the sensor is submerged or the portion of a full revolution at which the sensor is not submerged;

a processor in communication with said at least one sensor to receive said first and second signals and with said positioning detecting device or said time determining device and configured to calculate a ratio of said first portion or said second portion to said one complete revolution; and a memory in communication with said processor, said memory containing a geometric representation of said vessel, wherein said processor determines said volume of grey water in said vessel using said ratio and said geometric representation.

* * * * *